United States Patent
Kurashige et al.

(10) Patent No.: US 6,414,714 B1
(45) Date of Patent: *Jul. 2, 2002

(54) VIDEO CAMERA AND VIDEO CAMERA SETUP METHOD

(75) Inventors: Tadamasa Kurashige; Katsumi Kaneko; Masahiro Yamashita, all of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/649,643

(22) PCT Filed: Oct. 9, 1995

(86) PCT No.: PCT/JP95/02065

§ 371 (c)(1),
(2), (4) Date: Aug. 6, 1996

(87) PCT Pub. No.: WO96/11548

PCT Pub. Date: Apr. 18, 1996

(30) Foreign Application Priority Data

Oct. 7, 1994 (JP) .............................. 6-244286
Apr. 6, 1995 (JP) .............................. 7-081440

(51) Int. Cl.[7] .......................... H04N 7/18; H04N 5/225; H04N 5/235
(52) U.S. Cl. .......................... 348/207; 348/229; 348/72
(58) Field of Search .............................. 348/207, 312, 348/373, 374, 375, 294, 674, 444, 454, 72, 360, 361, 75, 229; 455/234.1

(56) References Cited

U.S. PATENT DOCUMENTS

| | | | | |
|---|---|---|---|---|
| 3,603,724 A | * | 9/1971 | Mc Mann, Jr. et al. ..... | 348/444 |
| 3,936,870 A | * | 2/1976 | Nakamura .................... | 358/27 |
| 4,559,554 A | * | 12/1985 | Nitta ............................ | 358/44 |
| 4,680,624 A | * | 7/1987 | Murakami .................... | 358/44 |
| 4,855,814 A | * | 8/1989 | Shiraishi et al. ............ | 348/360 |
| 5,040,068 A | * | 8/1991 | Parulski et al. ............. | 348/376 |
| 5,166,780 A | * | 11/1992 | Shyu .......................... | 348/444 |
| 5,166,782 A | * | 11/1992 | Asaida ........................ | 358/41 |
| 5,299,023 A | * | 3/1994 | Nagumo et al. ............. | 386/33 |
| 5,392,067 A | * | 2/1995 | Konno ........................ | 348/72 |
| 5,410,363 A | * | 4/1995 | Capen et al. ............... | 348/679 |
| 5,414,463 A | * | 5/1995 | Katoch et al. .............. | 348/207 |
| 5,434,615 A | * | 7/1995 | Matumoto .................... | 348/72 |
| 5,436,658 A | * | 7/1995 | Onga et al. ................. | 348/239 |
| 5,453,845 A | * | 9/1995 | Monoshita et al. ......... | 348/674 |
| 5,493,332 A | * | 2/1996 | Dalton et al. ............... | 358/207 |
| 5,594,502 A | * | 1/1997 | Bito et al. .................. | 348/373 |
| 5,812,731 A | * | 9/1998 | Sato et al. .................... | 386/45 |
| 6,046,769 A | * | 4/2000 | Ikeda et al. ................. | 348/233 |

* cited by examiner

Primary Examiner—Wendy R. Garber
Assistant Examiner—Rashwan N. Tillery
(74) Attorney, Agent, or Firm—Frommer Lawrence & Haug LLP; William S. Frommer; Bruno Polito

(57) ABSTRACT

A picture pickup block (12) of an optical head body (1) is detachably attached to a camera body (2). The picture pickup block (12) includes an EEPROM (129), which stores data in association with a picture pickup element, such as shading correction data, and setup data for the video camera, including signal-use location data. When the power is turned on, a microcomputer (201) in the camera body (2) reads setup data from the ROM (129), and sets up the video camera by controlling each circuit of the picture pickup block (12) and the camera body (2). For example, based on shading correction data, setup is performed so that a video signal for which shading correction has been performed is output. Also, based on signal-use location data, setup is performed so that a video signal in accordance with the appropriate signal standards of a particular signal-use location is output by controlling a level conversion circuit (206) and a setup level signal adding circuit (207).

22 Claims, 15 Drawing Sheets

F I G. 1
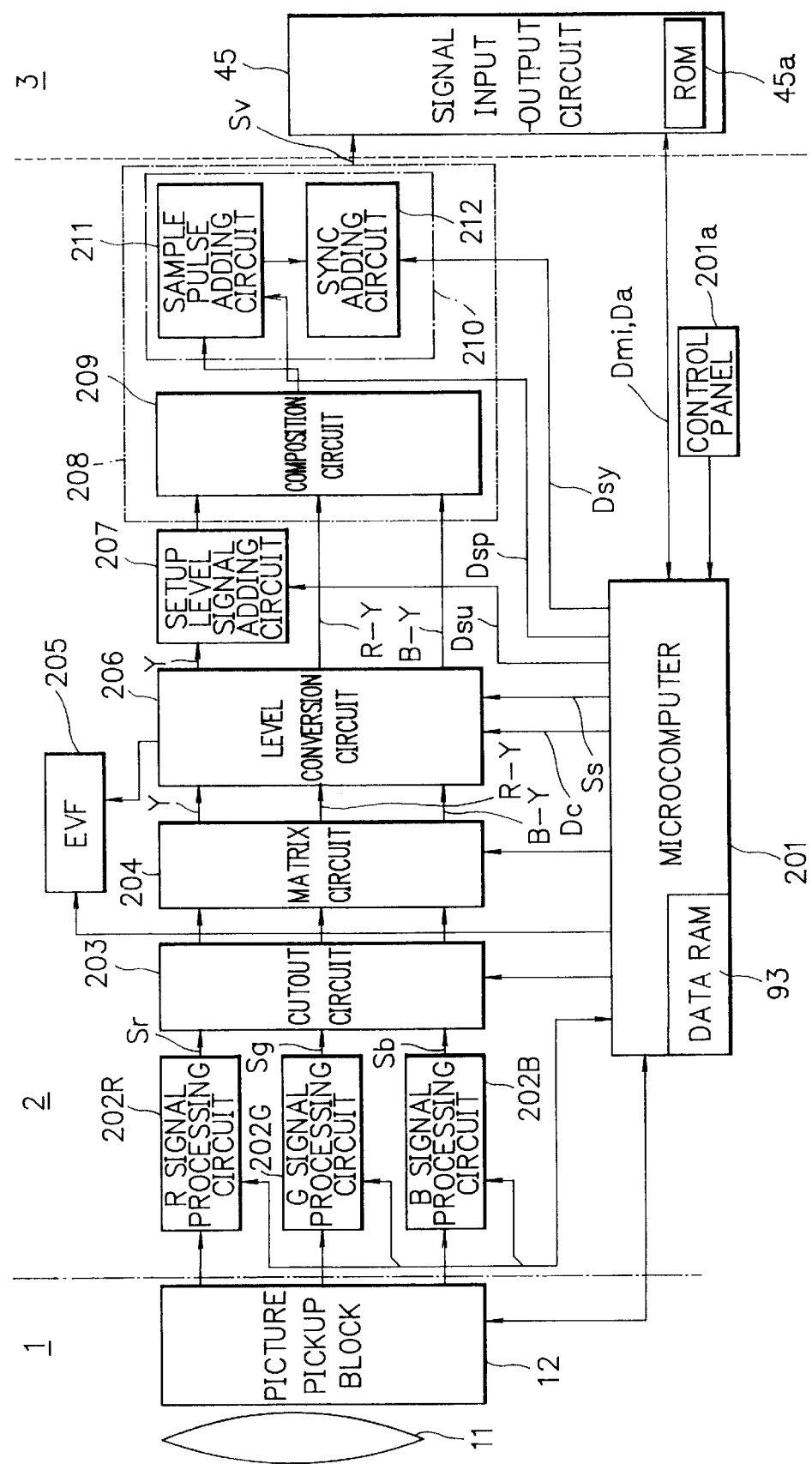

FIG. 15
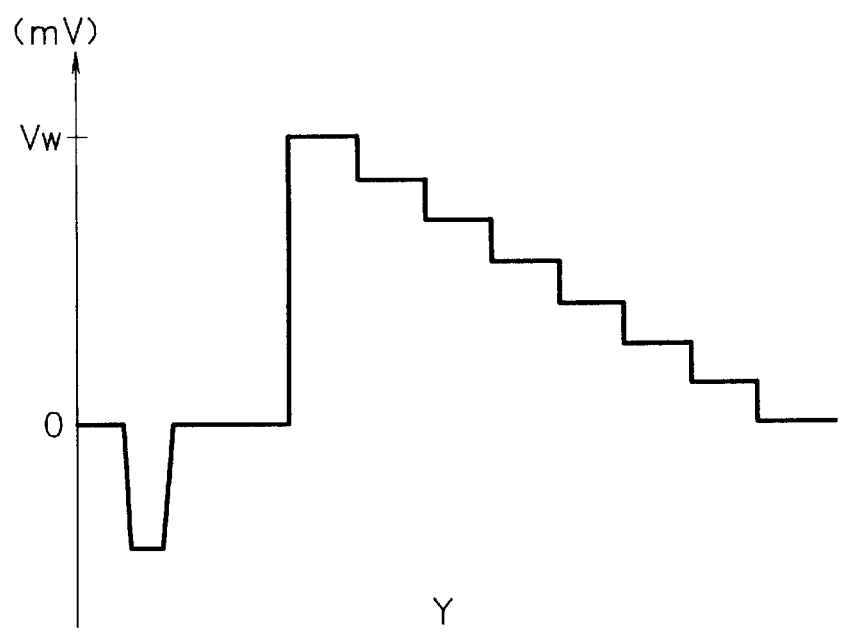
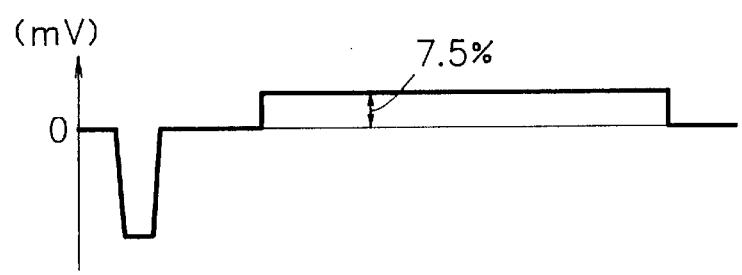
FIG. 16A
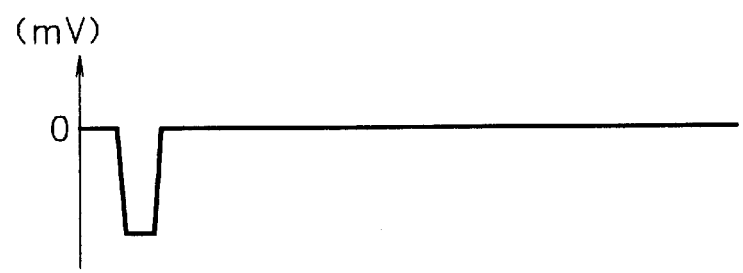
FIG. 16B

VIDEO CAMERA AND VIDEO CAMERA SETUP METHOD

TECHNICAL FIELD

The present invention relates to a video camera, for which certain adjustment can be eliminated or reduced when the picture pickup block using a picture pickup element must be replaced, and a video signal meeting differing standards depending on the country in which the video signal is to be used or to which the camera is to be shipped, (the signal-use location), can be produced without the need for a number of different circuit boards, and a setup method for the video camera.

BACKGROUND ART

Conventionally, a video camera has been proposed, to the body of which is detachably attached a picture pickup block consisting of a color separation prism, CCD (charge coupled device) solid-state picture pickup element, signal processing circuit, and other devices. When such picture pickup block is replaced, many items must be adjusted on the camera body side to correct for variations in the properties of the CCD solid-state picture pickup element and optical system.

Since many items must be adjusted on the camera body side in connection with the replacement of the picture pickup block, the user cannot simply replace the picture pickup block; special-purpose instruments, jigs, and tools are needed, and work by a specialist is required. Therefore, a camera body is provided with only one picture pickup block, and when a CCD is required or a shift of aspect ratio from 4:3 to 16:9 is needed, for example, the demand for the replacement of only the picture pickup block or the demand for a plurality of picture pickup blocks cannot be satisfied simply.

In the case of a video camera for broadcasting, which is used for photographing an artistic production such as a drama, high picture quality is generally demanded. Therefore, a three tube type video camera using three picture pickup tubes or a three plate type video camera using three solid-state picture pickup elements are typically used.

A system in which a three color separation prism is provided behind the picture pickup lens to separate the light passing through the picture pickup lens into the color component lights of R (red), G (green), and B (blue), is generally used, especially with the three plate type video camera. With this system, since the optical path of each color component light is independent, color correction can be made freely by inserting a trimming filter in each optical path. Therefore, this system has ideal picture pickup characteristics and the capability of obtaining a color image with good color tone. Also, an advantage of this system is that less incident light is absorbed, heightening the light utilization factor, making the production of such a highly sensitive camera relatively easily.

The process in which a composite picture signal is obtained from a picture pickup signal output from the picture pickup elements of R, G, and B is described below. First, the light passing through the picture pickup lens is separated into color component lights of R, G, and B by the three color separation prism, and sent to the picture pickup elements of R, G, and B, respectively. Thereupon, a color image of R, G, and B corresponding to the subject is formed on the picture pickup plane of the picture pickup element for R, G, and B.

Various types of signal processing, such as preamp, clamp, and gamma correction, can be performed on the picture pickup signal obtained by photoelectric transfer at each picture pickup element in order to form the color signals of R, G, and B. From the color signals of R, G, and B, a luminance signal Y, red color difference signal R-Y, and blue color difference signal B-Y are formed in a matrix circuit. Further, from the luminance signal Y and color difference signals R-Y and B-Y, a composite picture signal is formed in a composition circuit (encoder). In the composition circuit, a variety of processing is performed, including processing for adding a synchronizing signal to the luminance signal Y, color modulation processing for obtaining a carrier chrominance signal from the color difference signals R-Y and B-Y, composition processing for obtaining a composite picture signal by compounding the luminance signal Y to which the synchronizing signal is added and the carrier chrominance signal.

The composite picture signal output from the composition circuit is entered into a CCU (camera control unit) at a later stage of processing, for example, through a camera adapter and camera cable connected to the video camera. The CCU controls the adjustment of lens opening, selection of color filter or ND (neutral density) filter, compensation for cable length, correction of contour, gamma correction for each channel, knee characteristics, pedestal level, etc. When a picture pickup tube is used as the picture pickup element, the CCU can also control the adjustment of registration, beam quantity of the picture pickup tube, beam focus, beam alignment, and so on.

Japan, the United States, and Europe have different standards for the composite picture signal. For example, the NTSC standard used in Japan, the NTSC standard (RS170A) used in the United States, and the PAL standard used in Europe, maintain different levels of luminance signal Y and the color difference signals R-Y and B-Y composing the composite picture signal.

The difference in level of the luminance signal Y and the color difference signals R-Y and B-Y composing the composite picture signal, varying depending on the signal-use location are explained below with reference to the attached Table 1, and FIGS. 15, 16A, 16B, 17A, and 17B.

First, the white level (100% level) VW of the luminance signal is 714 mV for the NTSC standard in Japan, 714 mV for the NTSC standard in the United States, and 700 mV for the PAL standard in Europe (see attached Table 1 and FIG. 15). The setup level is 0% of the white level for the NTSC standard in Japan and the PAL standard in Europe (see attached Table 1 and FIG. 16B), and 7.5% of the white level in the NTSC standard in the United States (see attached Table 1 and FIG. 16A). Therefore, the white level of the luminance signal for the NTSC standard used in the United States is 714 mV, but the white level without consideration of setup level is 660.45 mV (=714×0.925 mV).

Next, the difference VP-P between the maximum level and the minimum level at 75% color bar of the color difference signals R-Y and R-Y is 700 mV for analog interface in Japan, 756 mV for analog interface in the United States, and 525 mV for analog interface in Europe (see attached Table 1 and FIGS. 17A and 17B).

In manufacturing video cameras used currently, for example, a circuit board incorporating a matrix circuit with the luminance signal Y and color difference signals R-Y and B-Y at the levels used, for example, in Europe, is mounted, and a number of circuit boards having the appropriate levels for Japan and the United States are delivered as options. That is to say, the levels of the luminance signal and color difference signals are set to one of the standards.

For this reason, when a CCU is externally connected to the camera adapter, the user uses the camera after converting the levels of the luminance signal and color difference signals to the appropriate levels for the country where broadcast is to be delivered by inputting various parameters of CCU. The aforementioned picture pickup block is also replaced with one complying with the appropriate standard. Usually, a sample pulse for AGC (automatic gain control) to detect the attenuation state in the transmission of a composite picture signal, is added to the vertical blanking period of composite picture signal, and the addition of the sample pulse is exclusively performed by the circuit in the camera adapter.

On the other hand, when a VTR (video tape recorder) is externally connected to the camera adapter, the current circuit board is replaced by the circuit board (option) complying with the appropriate standard in the country where the recorded material is to be used (broadcast), and thereafter the composite picture signal is supplied to the VTR. This replacement of circuit board can not be accomplished by a simple change of circuit boards. Since, as described above, the addition of the sample pulse is made by the circuit in the camera adapter, readjustment of signals is also needed. This readjustment takes much time, so that the replacement of the circuit board is very troublesome. Moreover, an inappropriate circuit board may be used, creating the possibility that the level of composite picture signal does not comply with the appropriate standard.

In particular, since the level of the sample pulse added by the camera adapter is uniform, even though the cable length would be ordinarily compensated for the CCU, depending on the type of equipment connected at the processing stage of following the CCU and also depending on the cable length, the level of the signal may be reduced and the sample pulse itself may disappear, making reproduction of the composite picture signal by the AGC impossible. Alternatively, a so-called matrix error due to improper readjustment or the like is also likely to occur.

Accordingly, an object of the present invention is to eliminate or reduce the adjustments necessary on the camera body side when the picture pickup block having a picture pickup element is replaced.

Another object of the present invention is to eliminate the need for replacing or readjusting of circuit boards each time the broadcast signal-use location is changed, thereby enhancing productivity and serviceability.

Still another object of the present invention is to reduce the circuits in the camera adapter, reduce costs, and reduce matrix errors.

DISCLOSURE OF THE INVENTION

According to the present invention, a video camera is comprised of a video camera body with a signal processing means which processes picture pickup signals obtained by picture pickup elements and outputs video signals, and a picture pickup block detachably attached to the video camera body which has the picture pickup elements. The picture pickup block has memory means for storing setup data for setting up the video camera, and the video camera body has a control means for setting up the video camera based on the setup data stored in the memory means. For example, in the signal processing means, the video signals are converted into a signal level determined in accordance with the intended signal-use location at the broadcast, which is one type of the setup data.

Also, according to the present invention, the video camera is comprised of a video camera body with a signal processing means which processes picture pickup signals obtained by picture pickup elements and outputs video signals, and a picture pickup block with the picture pickup elements, which is detachably attached to the video camera body, which also has a memory means for storing setup data for setting up the video camera. The video camera setup method comprises a step of reading the setup data from the memory means when the power is turned on and a step of setting up the picture pickup block and the video camera body based on the setup data read in the first step above.

According to the present invention, the video camera is further comprised of a camera adapter for connecting external equipment. The camera adapter includes an output means for outputting video signals from the video camera body, and a storage means for storing connected equipment information data indicating the type of external equipment. The signal processing means on the video camera body further includes a signal adding means for adding a sample pulse used for detecting an attenuation level due to the transmission of video signals output from the camera adapter based on the connected equipment information data.

Thus, for example, when the power is turned on, setup is automatically performed by controlling each circuit of the picture pickup block and the video camera body based on the setup data, such as shading correction data and signal-use location code, read from the memory means of the picture pickup block. Therefore, adjustments to the camera body side when the picture pickup block is replaced and the reassembly of circuit boards formerly required when the signal-use location was changed can now be eliminated or reduced.

Also, a sample pulse used for detecting an attenuation level due to the transmission of the video signals can be added to the video camera body. Therefore, a circuit for adding a sample pulse by the camera adapter can be eliminated, resulting in a reduction in cost.

In the signal processing means, the signal level of the video signals is converted into a signal level in accordance with the intended broadcast signal-use location based on signal-use location data, which is one of the setup data. Therefore, the need for a readjustment of the signal is eliminated, so that matrix errors caused by improper readjustment, etc., can be reduced.

BRIEF DESCRIPTION OF THE DRAWINGS

FIGS. 1 and 2 are block diagrams showing an example in which a video camera in accordance with the present invention is applied to a studio camera for broadcasting;

FIG. 15 is a waveform diagram showing an example of the horizontal waveform of luminance signal Y;

FIGS. 16A and 16B are waveform diagrams showing a portion of the horizontal waveform of luminance signal Y in order to explain the setup standard.

BEST MODE FOR CARRYING OUT THE INVENTION

FIG. 1 shows a specific example in which a video camera in accordance with the present invention is applied to a studio camera for broadcasting. The video camera shown in FIG. 1 consists of an optical head body (OHB) 1 and a camera body 2. The optical head body 1 is comprised of a picture pickup lens 11 and a picture pickup block (CCD block) 12 having picture pickup elements. The optical head body 1 is mechanically connected to the camera body 2 by using, for example, four screws, so that when the optical head body 1 is replaced, it can be attached to or detached from the camera body 2 simply by loosening the four screws with a coin. The electrical connection between the picture pickup block 12 of the optical head body 1 and the camera body 2 is made through a connector directly or through a connector and a signal line which include a flexible cable.

Figure 2:
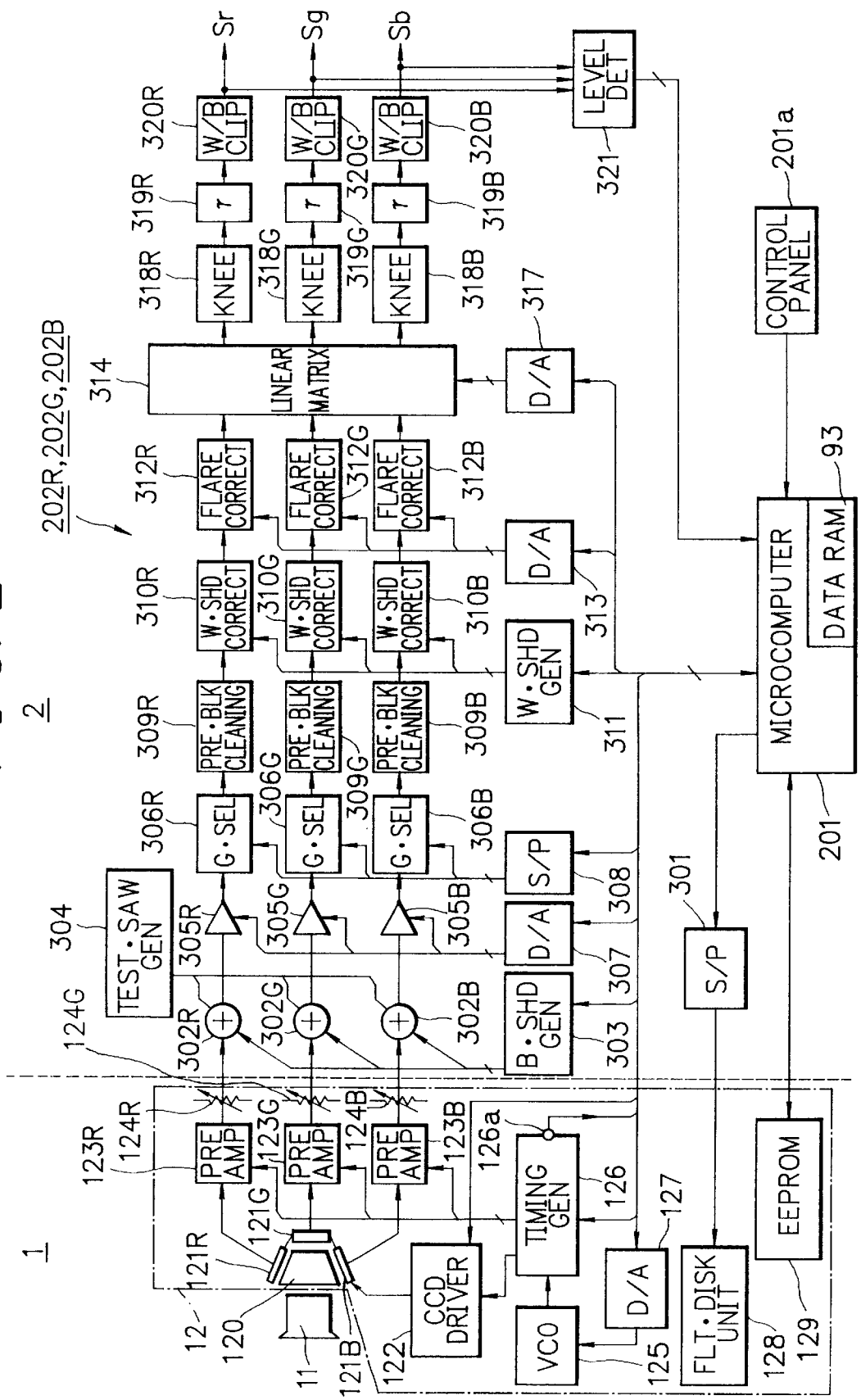

As shown in FIG. 2, the picture pickup block 12 has a color separation prism 120 for separating the light output in the picture pickup block 12 through the picture pickup lens 11 into color component lights of R, G, and B, CCD solid-state picture pickup elements 121R, 121G, and 121B in which the color component lights of R, G, and B separated by the color separation prism 120 are input, and a red image, green image, and blue image associated with the subject are formed on a picture pickup plane, respectively, and a CCD driver 122 for driving the picture pickup elements 121R, 121G, and 121B.

The picture pickup block 12 also includes preamp circuits 123R, 123G, and 123B in which the picture pickup signals of R, G, and B output from the picture pickup elements 121R, 121G, and 121B, respectively, are amplified, and already well-known correlation double sampling is conducted for performing certain processing, such as reducing reset noise, and gain adjusting circuits 124R, 124G, and 124B for performing level adjustment of color signals R, G, and B output from the preamp circuits 123R, 123G, and 123B, respectively. The gain adjusting circuits 124R, 124G, and 124B suppress the level difference in color signals caused by variations in sensitivity of the picture pickup elements 121R, 121G, and 121B.

The picture pickup block 12 further includes a voltage control oscillator (VCO) 125 for generating a reference clock, and a timing generator 126 for obtaining various timing signals based on the reference clock output from the voltage control oscillator 125. A necessary timing signal is supplied from the timing generator 126 to each of the aforementioned CCD driver 122 and preamp circuits 123R, 123G, and 123B. Although not shown, necessary timing signals are also supplied from the timing generator 126 to other circuits.

The voltage control oscillator 125 is supplied with VCO offset data from a microcomputer 201, described below, of the camera body 2 via a D/A converter 127, whereby the frequency of reference clock output from the voltage control oscillator 125 is made constant. The CCD driver 122 is supplied with substrate clock voltage Vsub and reset gate clock voltage Vrg, described below, from the microcomputer 201 of the camera body 2, which voltages control the operation of the CCD driver 122. The timing generator 126 is supplied with BLK offset data, described below, from microcomputer 201 of the camera body 2, which data controls the operation of the timing generator 126.

The timing generator 126 has a terminal 126a for obtaining data showing whether the picture pickup element is of an interline transfer type (IT type) or a frame interline transfer type (FIT type). Since the number of timing signals output from the timing generator 126 differs between the IT type and the FIT type, the data showing whether the picture pickup element is of an IF type or a FIT type is output from the terminal 126a according to the number of timing signals. The data obtained at terminal 126a of the timing generator 126 is supplied to the microcomputer 201 of the camera body 2.

The picture pickup block 12 also has a filter disk unit 128. The filter disk unit 128 switches to an ND filter or CC filter (color conversion filter). The ND filter, which is an optical filter for uniformly decreasing light without selecting waveform in a visible zone, is used, for example, when a decrease in light is desired without changing the diaphragm of the optical system. ND filters of various densities which can decrease light to ¼, ⅛, ¹⁄₁₆, and so on, are available. The CC filter is used to change the color temperature of illuminating light when a color video camera is used under an illuminating light with a color temperature which does not allow for the optimum color balance. CC filters of various color temperatures such as 4300 K, 6300 K, 8000 K, and so on, are available. The filter disk unit 128 is supplied with a filter switching control signal from the microcomputer 201 of the camera body 2 through a serial/parallel converter (S/P converter) 301, which control signal controls the switching operations of the ND filter and the CC filter.

The picture pickup block 12 also has an EEPROM (electrically erasable and programmable read-only memory) 129 as a reloadable nonvolatile memory. The EEPROM 129 stores, as setup data, white shading data of the picture pickup elements 121R, 121G, and 121B, substrate clock voltage data, reset gate clock voltage data, BLM offset data (temperature characteristics data) of the picture pickup element 121R, 121G, and 121B, offset data of VCO for controlling the voltage control oscillator 125, aspect ratio data showing the aspect ratio of the picture pickup element 121R, 121G, and 121B, signal-use location data showing the signal-use location of the video camera, white offset data for correcting the shift of balance of R, G, and B color signals when the ND filter is inserted, serial number data of the picture pickup block 12, masking data showing the color separation characteristics of the color separation prism 120, ND filter data and CC filter data showing the types of ND filters and CC filters for the filter disk unit 128, color temperature data showing the color temperature of the CC filter, IR filter data showing the thickness of an infrared cut filter, and so on.

For example, as shown in attached Table 2, white shading data (WHT SHADING) for correcting the white shading of the picture pickup elements 121R, 121G, and 121B is stored at address "000–5FF." The reason for storing a lot of white shading data in such a manner is that the correction accuracy is increased by setting many correction points on one screen. Substrate clock voltage data (Vsub data) of the picture pickup elements 121R, 121G, and 121B is stored at addresses "700" to "702." An address "703," VCO offset data for making the frequency of clock output from the voltage control oscillator 125 constant is stored. At address "704," BLK offset data of the picture pickup elements 121R, 121G, and 121B, used for dark correction, is stored. At addresses "705" to "707," the reset gate clock voltage data (Vrg data) for the picture pickup elements 121R, 121G, and 121B is stored. The substrate clock voltage Vsub is a positive DC bias voltage applied to the substrate, and the reset gate clock voltage Vrg is a setting voltage for resetting the voltage of floating diffusion to the voltage of the reset drain bias.

Aspect ratio data (16:9/4:3) showing the aspect ratio of the picture pickup elements 121R, 121G, and 121B is stored at address "70B." Signal-use location data (U/J/E) showing the intended signal-use location for the video camera is stored at address "70C." Here, U, J, and E denote the United States, Japan, and Europe, respectively. White offset data (Rch offset, Bch offset) for correcting the shift of balance of R, G, and B color signals when four ND filters mounted in the filter disk unit 128 are inserted is stored at address "710"–"711," "712"–"713," "714"–"715," "716–717," "718"–"719," "71A"–"71B," "71C–71D," and "71E"–"71F."

Also, serial number data (CCD BLOCK NUM) of the picture pickup block 12 is stored in ASCII code at addresses "720" to "72F." Masking data (MASK (B, R) DATA–MASK (G, B) DATA) showing the color separation characteristics of the color separation prism 120 is stored at address "748"–"749," "74A"–"74B," "74C"–"74D," "74E"–"74F," "750"–"751," and "752"–"753." At addresses "754," "756," "758," and "75A," ND filter data (ND1 DATA–ND4 DATA) showing the types of four ND filters mounted in the filter disk unit 128 is stored. Here, "FFFFh" indicates that the ND filter is "absent." In attached Table 2, "h" indicates hexadecimal notation.

Also, in address "75C," "75E," "760," and "762," CC filter data (CC1 DATA–CC4 DATA) showing the types of four CC filters mounted in the filter disk unit 128 is stored. Here, "2000h" indicates transparency, "3802h" indicates a 5600 K CC filter with light decreased to ¼, "3800h" indicates a 5600 K CC filter without a light decrease, and "3804h" indicates a 5600 K CC filter with light decreased to 1/16.

Color temperature data (CC1 OFFSET–CC4 OFFSET) showing the color temperature of four CC filters mounted in the filter disk unit 128 is stored at address "764"–"765," "766"–"767," "768"–"769," and "76A"–"76B." In this case, the data is mired data obtained by multiplying the inverse number of color temperature by one million. At address "76C," IR filter data (IR CUT FILT DATA) showing the thickness of the infrared cut filter is stored; in this case, 0.9 mm=90.

As described above, the setup data stored in the EEPROM 129 is written in advance, for example, when the camera is shipped from the factory, so as to show the characteristics, etc., of the picture pickup block 12.

The aforementioned EEPROM 129 is connected to the microcomputer 201 of the camera body 2. As described below, when the power is on, the above-described various data are read as the setup data by the EEPROM 129 under the control of the microcomputer 201, and based on the data, the setup of the circuits of the picture pickup block 12 in the optical head body 1 and the camera body 2 is automatically performed.

The configuration of the camera body 2 is described below with reference to FIG. 1.

The camera body 2 includes processing circuits 202R, 202G, and 202B for processing R, G, and B color signals, respectively, output from the picture pickup block 12 in the optical head body 1, a cutout circuit 203 for taking out only the necessary portion of the R, G, and B color signals Sr, Sg, and Sb output from the processing circuits 202R, 202G, and 202B, respectively, and a matrix circuit 204 for performing matrix processing on the color signals Sr, Sg, and Sb taken from the cutout circuit 203 to form the luminance signal Y and color difference signals R-Y and B-Y. The operations of these processing circuits 202R, 202G, and 202B, the cutout circuit 203, and the matrix circuit 204 are controlled by the microcomputer 201.

In the cutout circuit 203, based on the aspect ratio data obtained from the EEPROM 129, cutout processing is performed in connection with the relationship between the aspect ratios of the picture pickup elements 121R, 121G, and 121B and the aspect ratio of video signal to be output. For example, if the aspect ratios of the picture pickup elements 121R, 121G, and 121B are 16:9, all portions of the color signals Sr, Sg, and Sb are taken when the aspect ratio of video signal to be output is 16:9. On the other hand, only part of the color signals Sr, Sg, and Sb is taken out when the aspect ratio of video signal to be output is 4:3. The aspect ratios of the picture pickup elements 121R, 121G, and 121B are judged by the aspect ratio data showing the aspect ratio read from the EEPROM 129 when the power is on.

The camera body 2 also has a level conversion circuit 206 for converting the levels of the luminance signal Y and color difference signals R-Y and B-Y output from the matrix circuit 204, a setup level signal adding circuit 207 for adding a setup level signal to the luminance signal Y output from the level conversion circuit 206, and a composition circuit system 208 for forming a composite picture signal Sv by compounding the luminance signal Y output from the setup level signal adding circuit 207 and the color difference signals R-Y and B-Y output from the level conversion circuit 206. The operations of the level conversion circuit 206, the setup level signal adding circuit 207, and the composition circuit system 208 are controlled by the microcomputer 201.

From the level conversion circuit 206, a picture signal supplied to an electronic view finder (EVF) 205 is output. The operation of the electronic view finder 205 is also controlled by the microcomputer 201. In this case, the deflecting system of the electronic view finder 205 is controlled by the aspect ratio of video signal to be output.

As shown in FIG. 2, the processing circuits 202R, 202G, and 202B have adders 302R, 302G, and 302B, respectively, in which the R, G, and B color signals output from gain adjusting circuits 124R, 124G, and 124B of the picture pickup block 12 are supplied, a correction waveform signal output from a black shading generator 303 is added, and a saw-shaped wave signal (SAW signal) output from a test SAW signal generator 304 when the camera is adjusted is added.

The correction waveform signal output from the black shading generator 303, which corrects black shading and makes corrections so that the black level is not changed in the gain select circuit, described below, when gain is increased, is formed by mixing horizontal and vertical saw-shaped signals, parabola wave signal, etc., at an appropriate level ratio. The black shading generator 303 is supplied with control data from the microcomputer 201, which controls the operation of the black shading generator 303. Although detailed description is omitted, the saw-shaped wave signal output from the generator 304 when the camera is adjusted is supplied to a gain control amplifier, described below, through the adders 302R, 302G, and 302B, which make the adjustments of the gamma correction circuit, knee circuit, and so on.

The processing circuits 202R, 202G, and 202B have gain control amplifiers 305R, 305G, and 305B for making white balance adjustments, etc., by controlling the level of the output signal of the adders 302R, 302G, and 302B, and gain select circuits 306R, 306G, and 306B for selecting a gain with respect to the output signal of the gain control amplifiers 305R, 305G, and 305B. With the gain select circuits 306R, 306G, and 306B, a gain of −3 dB, 0 dB, +3 dB, +6 dB, +9 dB, +12 dB, +18 dB, etc., can be selected, so that the levels of red signal, green signal, and blue signal can be adjusted by increasing gain when the quantity of light is small and the subject is dark.

The gain control amplifiers 305R and 305B are supplied with white offset data from the microcomputer 201 via a D/A converter 307, whereby the gain of the gain control amplifiers 305R and 305B is controlled, and the white balance of R and B color signals is achieved with respect to the G color signal. The gain select circuits 306R, 306G, and 306B are supplied with a gain select control signal from the microcomputer 201 via a serial/parallel converter (S/P converter) 308, which selects the gains of the gain select circuits 306R, 306G, and 306B. The gain select operation is performed by the operation of a control panel 201a, connected to the microcomputer 201 of the camera body 2, by the camera operator, or the operation of the CCU (camera control unit).

The processing circuits 202R, 202G, and 202B include preblanking cleaning circuits 309R, 309G, and 309B for doing processing of inserting signals of a constant level in the blanking period of output signal of the gain select circuits 306R, 306G, and 306B, and white shading correction circuits 310R, 320G, and 310B for carrying out gain control of the output signal from the cleaning circuits 309R, 309G, and 309B.

A white shading generator 311 is supplied with white shading data from the microcomputer 201, which controls the operation for generating the correction waveform signal of the white shading generator 311. The white shading correction circuits 310R, 310G, and 310B are supplied with a correction waveform signal for correcting the white shading of the picture pickup elements 121R, 121G, and 121B from the white shading generator 311.

The processing circuits 202R, 202G, and 202B have flare correction circuits 312R, 312G, and 312B for correcting the rise of the black level caused by the flare of the optical system or picture pickup elements with respect to the output signal of the white shading correction circuits 310R, 310G, and 310B, and a linear matrix circuit 314 for correcting the difference in tint caused by the variations in spectral sensitivity of the color separation prism 120 with respect to the output signal of the flare correction circuits 312R, 312G, and 312B. The flare correction circuits 312R, 312G, and 312B are supplied with a flare correction control signal from the microcomputer 201 via a D/A converter 313, which controls the correcting operation of the flare correction circuits 312R, 312G, and 312B. The flare correction signal is supplied, for example, by the operation of the CCU.

Figure 3:
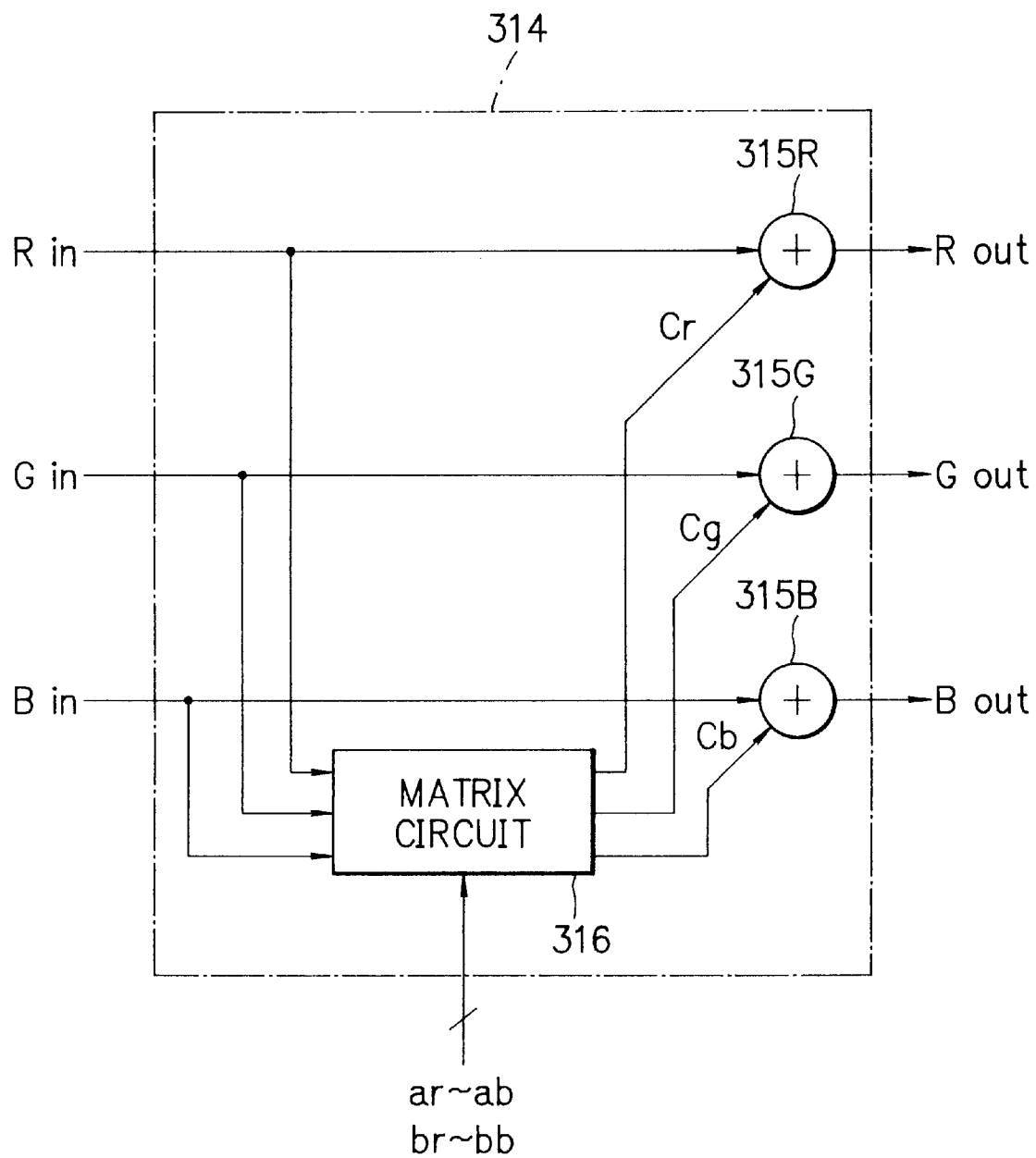
FIG. 3 is a circuit diagram showing a typical configuration of a linear matrix circuit incorporated in the camera body in accordance with the present invention.

FIG. 3 shows a typical configuration of the linear matrix circuit 314. In this figure, the R, G, and B color signals Rin, Gin, and Bin are supplied to the adders 315R, 315G, and 315B, respectively, and are also supplied to a matrix circuit 316. In the matrix circuit 316, correction signals Cr, Cg, and Cb are formed with respect to the color signals Rin, Gin, and Bin as expressed by Eq. (1). The matrix circuit 316 is supplied with masking data of factors ar (=MASK (R,G) DATA), ag (=MASK (G, B) DATA), ab (=MASK (B, R) DATA), br (=MASK (R, B) DATA), bg (=MASK (G, R) DATA), and bb (=MASK (B, G) DATA), corresponding to the spectral sensitivity of the color separation prism 120 from the microcomputer 201 via a D/A converter 317.

$$Cr = ar\ (Rin-Gin) + br\ (Rin-Bin)$$

$$Cg = ag\ (Gin-Bin) + bg\ (Gin-Rin)$$

$$Cb = ab\ (Bin-Rin) + bb\ (Bin-Gin) \quad (1)$$

The correction signals Cr, Cg, and Cb output from the matrix circuit 316 are supplied to the adders 315R, 315G, and 315B, respectively, and added to the color signals Rin, Gin, and Bin. The output signals of the adders 315R, 315G, and 315B are output as corrected R, G, and B color signals Rout, Gout, and Bout.

Referring again to FIG. 2, the processing circuits 202R, 202G, and 202B include knee circuits 318R, 318G, and 318B for performing compression processing of dynamic range for R, G, and B color signals output from the linear matrix circuit 304, gamma correction circuits 319R, 319G, and 319B for making gamma correction for output signals of the knee circuits 318R, 318G, and 318B, clip circuits 320R, 320G, and 320B for obtaining R, G, and B color signals Sr, Sg, and Sb by performing white clip processing and black clip processing on the output signals of the gamma correction circuits 319R, 319G, and 319B, and a level detector 321 for detecting the levels of R, G, and B color signals Sr, Sg, and Sb in order to supply such signals to the microcomputer 201. In the microcomputer 201, based on the detection output of the level detector 321, the white balance adjustment can be made by controlling, for example, the gain of the gain control amplifiers 305R, 305G, and 305B.

Although not described above, the control data supplied to each circuit of the microcomputer 201 is data of a serial form, and clock and load data are supplied together with the control data. In each circuit, based on the clock and load data, the data in serial form is used after being converted into parallel form. That is to say, the CCD driver 122 of the picture pickup block 12, the timing generator 126, the D/A converter 127, the black shading generator 303 of the camera body 2, the D/A converters 307, 313, and 317, and the white shading generator 311 have a function for converting serial data into parallel data.

However, the filter disk unit 128 of the picture pickup block 12 and the gain select circuits 306R, 306G, and 306B of the camera body 2 can not convert serial data into parallel data, so that the serial/parallel converters (S/P converters) 301 and 308 are used to convert serial data into parallel data.

The setup data supplied to each circuit from the microcomputer 201 is provided with a header section in which identification data is included to identify the circuit for which the data is intended. In each circuit, the setup operation is performed only when it is judged that the identification data is intended for such circuit.

Figure 4:
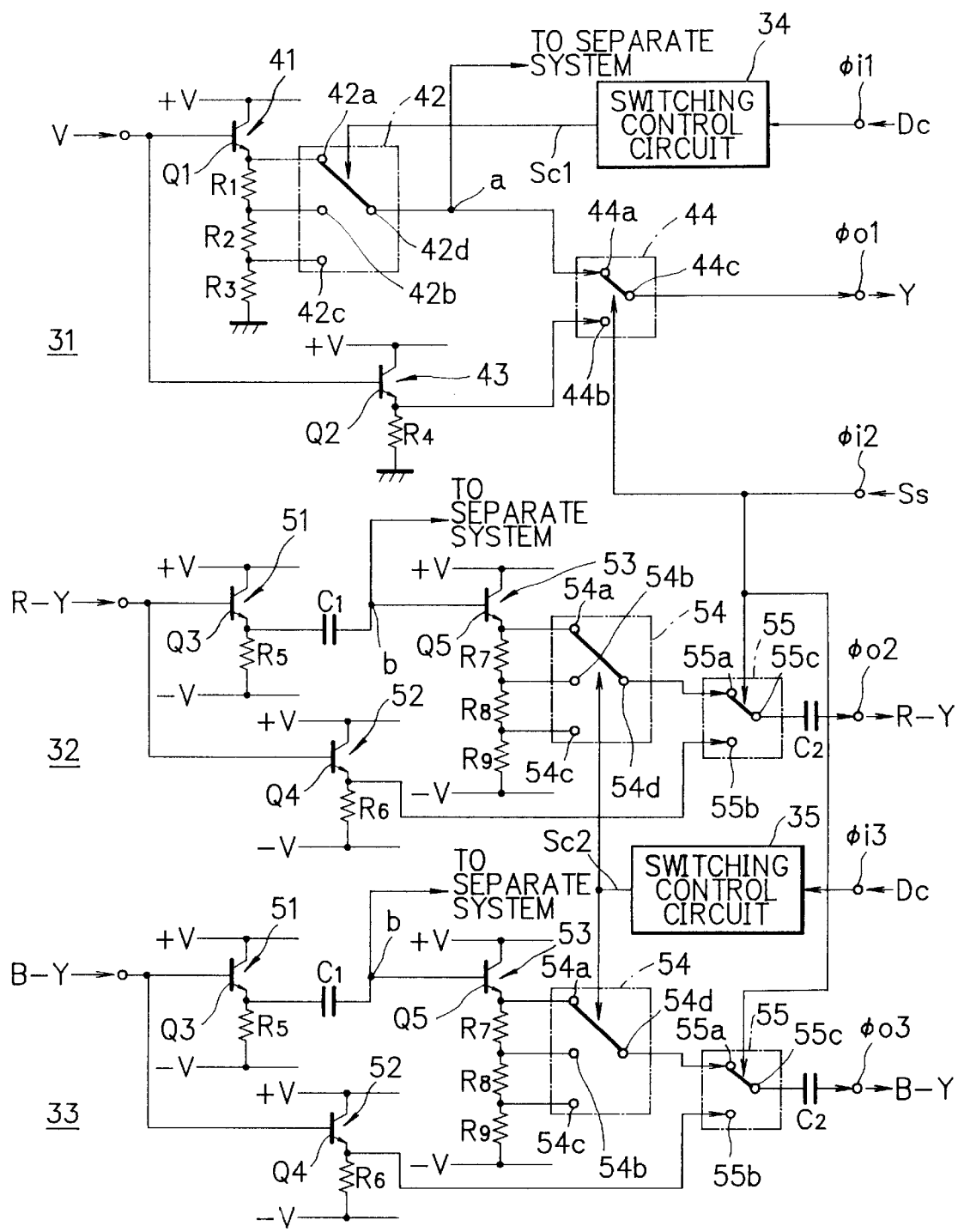
FIG. 4 is a circuit diagram showing a typical configuration of a level conversion circuit in accordance with the present invention.
Figure 5:
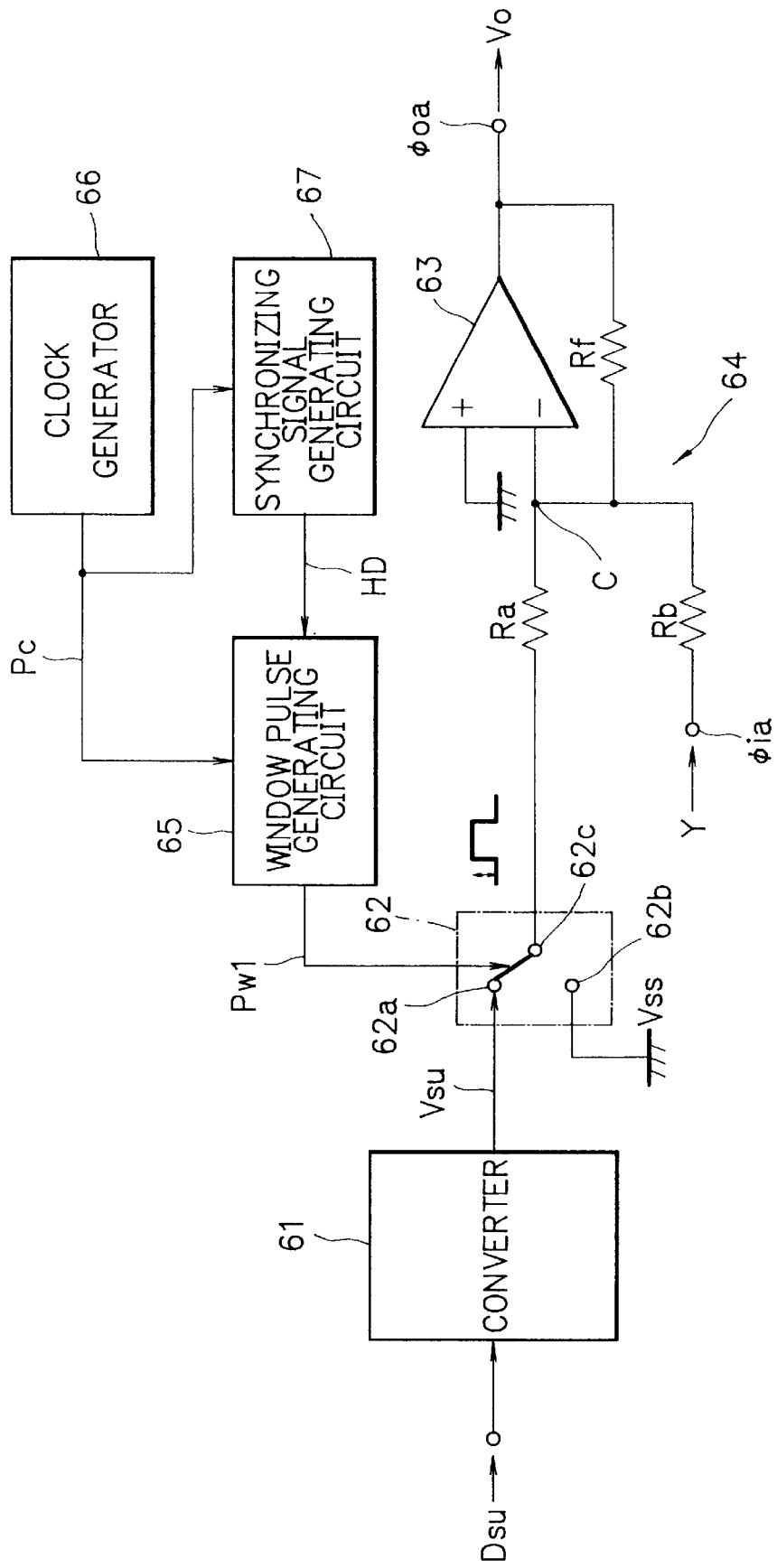
FIG. 5 is a circuit diagram showing a typical configuration of a setup level signal adding circuit incorporated in the camera body in accordance with the present invention.

Referring again to FIG. 1, as described above, the level conversion circuit 206 is connected to the matrix circuit 204 which is the next processing stage. FIG. 4 shows a typical configuration of the level conversion circuit 206.

The level conversion circuit 206 includes a luminance signal level conversion circuit 31, two color difference signal level conversion circuits 32 and 33, and two switching control circuits 34 and 35.

The luminance signal level conversion circuit 31 is comprised of a first level conversion circuit 41 for converting the white level of the luminance signal Y into the three levels (714 mV, 700 mV, and 660.45 mV), a first switching circuit 42 for selecting any one level of three levels from the first level conversion circuit 41, a second level conversion circuit 43 for converting the white level of the luminance signal Y into a single level (700 mV), and a second switching circuit 44 for selecting one output signal from among the output signals from the first switching circuit 42 and the output signals from the second level conversion circuit 43.

The first level conversion circuit 41, has an NPN transistor Q1 for driving from which power voltage +V is applied to the collector terminal and the luminance signal Y is input into the base terminal, and is constructed so that three resistors R1, R2, and R3 are connected in a series between the emitter terminal of the transistor Q1 and the ground (GND). In this first level conversion circuit 41, when the luminance signal Y is at the white level, the resistance values of the resistors R1, R2, and R3 are set so that the voltage of the emitter terminal is 714 mV, the voltage at the connection point of the resistors R1 and R2 is 700 mV, and the voltage at the connection point of the resistors R2 and R3 is 660.45 mV, due to the resistive potential ratio of the three resistors R1, R2, and R3.

The first switching circuit 42 is comprised of a first fixed contact 42a connected to the emitter terminal of the transistor Q1 in the first level conversion circuit 41, a second fixed contact 42b connected to the connection point of resistors R1 and R2, a third fixed contact 42c connected to the connection point of resistors R2 and R3, and a movable contact 42d connected to the output side. The movable contact 42d is electrically connected to one fixed contact of the first to third fixed contacts 42a to 42c based on a switching control signal Sc1 from the switching control circuit 34.

Based on the signal-use location data which is read from the EEPROM 129 in the picture pickup block 12 of the optical head body 1 when the power is turned on and which is stored in the data RAM in the microcomputer 201, the microcomputer 201 prepares signal-use location data Dc. The switching control circuit 34 decodes the signal-use location data Dc sent from the microcomputer 201, prepares a switching control signal Sc1 with an attribute corresponding to the content shown by the signal-use location data Dc, and sends the signal out.

Specifically, when signal-use location data Dc indicating a first signal-use location (for example, Japan) is sent from the microcomputer 201 through an input terminal φi1, the switching control circuit 34 outputs a switching control signal Sc1 for electrically connecting the movable contact 42d to the first fixed contact 42a. When signal-use location data Dc indicating a second signal-use location (for example, the United States) is sent from the microcomputer 201, the switching control circuit 34 outputs a switching control signal Sc1 for electrically connecting the movable contact 42d to the third fixed contact 42c. When signal-use location data Dc indicating a third signal-use location (for example, Europe) is sent from the microcomputer 201, the switching control circuit 34 outputs a switching control signal Sc1 for electrically connecting the movable contact 42d to the second fixed contact 42b.

The second level conversion circuit 43, has an NPN transistor Q2 for driving from which power voltage +V is applied to the collector terminal and the luminance signal Y is input into the base terminal, and is constructed so that one resistor R4 is connected between the emitter terminal of the transistor Q2 and the ground (GND). In this second level conversion circuit 43, when the luminance signal Y is at the white level, the resistance value of the resistor R4 is set by dropping the voltage level there so that the voltage of the emitter terminal becomes 700 mV.

The second switching circuit 44 comprises a first fixed contact 44a connected to the movable contact 42d of the first switching circuit 42, a second fixed contact 44b connected to the emitter terminal of the transistor Q2 of the second level conversion circuit 43, and a movable contact 44c connected to the output side.

The movable contact 44c is connected selectively and electrically to the first fixed contact 44a or the second fixed contact 44b based on the selection signal Ss supplied from the microcomputer 201 to an input terminal φi2. The selection signal Ss is prepared by the microcomputer 201 based on connected equipment information data Dmi which is read from a ROM 45a in a signal input-output circuit 45 incorporated in a camera adapter 3 connected to the camera body 2 when the power is on, and which is stored in the data RAM in the microcomputer 201. The selection signal Ss is a high-level signal when the external equipment connected to the camera adapter 3 is, for example, a VTR, and is a low-level signal when the external equipment is a CCU. The movable contact 44c of the second switching circuit 44 is selectively switched depending on whether the level of the selection signal Ss is high or low.

For example, when the external equipment is a VTR, a high-level selection signal Ss is sent from the microcomputer 201, so that the movable contact 44c of the second switching circuit 44 is electrically connected to the first fixed contact 44a, and an output signal (luminance signal in which the white level is any of 714 mV, 700 mV, and 660.45 mV) Y from the first switching circuit 42 is output from an output terminal φo1. On the other hand, when the external equipment is a CCU, a low-level selection signal Ss is sent from the microcomputer 201, so that the movable contact 44c of the second switching circuit 44 is electrically connected to the second fixed contact 44b, and an output signal (luminance signal in which white level is 700 mV) Y from the second level conversion circuit 43 is output from an output terminal φo1.

In the luminance signal level conversion circuit 31, the output signal Y from the first switching circuit 42 is sent to a separate circuit system (for example, a view finder driving circuit) via a contact a on a signal line between the first switching circuit 42 and the second switching circuit 44.

Since the color difference signal level conversion circuit 32 and 33 have the same configuration, mainly the circuit configuration of the level conversion circuit 32 for color difference signal R-Y will be described below.

The color difference signal level conversion circuit 32 includes a first level conversion circuit 51, which makes the color difference signal centered at 0 V into a color difference signal centered at a certain DC level (direct current level), and also converts the differences between the maximum and minimum levels of the 75% color bar of the color difference signal (hereinafter called "peak-to-peak levels") to a single level (756 mV), and a second level conversion circuit 52, which makes the color difference signal centered at 0 V into a color difference signal centered at a certain DC level, and also converts the peak-to-peak levels of the color difference signal into a single level (525 mV).

The color difference signal level conversion circuit 32 also has a coupling capacitor C1 for converting a color difference signal from the first level conversion circuit 51 into a color signal centered at 0 V, a third level conversion circuit 53, which makes the color difference signal centered at 0 V, sent from the coupling capacitor C1, into a color difference signal centered at a certain DC level, and also converts the peak-to-peak levels of the color difference signal into three kinds of levels (756 mV, 700 mV, and 525 mV), a first switching circuit 54 for selecting any one of the three kinds of levels sent from the third level conversion circuit 53, a second switching circuit 55 for selecting one output signal from among the output signals sent from the first switching circuit 54 and the output signals sent from the second level conversion circuit 52, and a coupling capacitor C2 for converting a color difference signal from the second switching circuit 55 into a color difference signal centered at 0 V.

The first level conversion circuit 51 has an NPN transistor Q3 for driving from which power voltage +V is applied to the collector terminal and the color difference signal R-Y is input into the base terminal, and is constructed so that one resistor R5 is connected between the emitter terminal of the transistor Q3 and a negative power source (−V). In this first level conversion circuit 51, the resistance value of the resistor R5 is set by reducing the voltage so that the peak-to-peak level of the color difference signal R-Y is 756 mV.

The second level conversion circuit 52 has an NPN transistor Q4 for driving in which power voltage +V is applied to the collector terminal and the color difference signal R-Y is put in the base terminal, and is constructed so that one resistor R6 is connected between the emitter terminal of the transistor Q4 and a negative power source (−V). In this second level conversion circuit 52, the resistance value of the resistor R6 is set by reducing the voltage level there so that the peak-to-peak levels of the color difference signal R-Y becomes 525 mV.

The third level conversion circuit 53 has an NPN transistor Q5 for driving from which power voltage +V is applied to the collector terminal and the level converted color difference signal from the first level conversion circuit 51 is input into the base terminal, and is constructed so that three resistors R7, R8, and R9 are connected in a series between the emitter terminal of the transistor Q5 and a negative power source (−V). In this third level conversion circuit 53, the resistance values of the resistors R7, R8, and R9 are set so that the peak-to-peak level of the signal output from the emitter terminal is 756 mV, the peak-to-peak level of the signal output from the connection point between the resistors R7 and R8 is 700 mV, and the peak-to-peak level of the signal output from the connection point between the resistors R8 and R9 is 525 mV, due to the resistive potential ratio of three resistors R7, R8, and R9.

The first switching circuit 54 is comprised of a first fixed contact 54a connected to the emitter terminal of the transistor Q5 in the third level conversion circuit 53, a second fixed contact 54b connected to the connection point of resistors R7 and R8, a third fixed contact 54c connected to the connection point of resistors R8 and R9, and a movable contact 54d connected to the output side. The movable contact 54d is electrically connected to one fixed contact of the first to third fixed contacts 54a to 54c, based on a switching control signal Sc2 from the switching control circuit 35.

The switching control circuit 35 decodes the signal-use location data Dc sent from the microcomputer 201 to an input terminal $\phi i3$, prepares a switching control signal Sc2 with an attribute corresponding to the content shown by the signal-use location data Dc, and sends such signal out.

Specifically, when signal-use location data Dc indicating a first signal-use location (Japan) is sent from the microcomputer 201 through an input terminal $\phi i3$, the switching control circuit 35 outputs a switching control signal Sc2 for electrically connecting the movable contact 54d to the second fixed contact 54b. When signal-use location data Dc indicating a second signal-use location (the United States) is sent from the microcomputer 201, the switching control circuit 35 outputs a switching control signal Sc2 for electrically connecting the movable contact 54d to the first fixed contact 54a. When signal-use location data Dc indicating a third signal-use location (Europe) is sent from the microcomputer 201, the switching control circuit 35 outputs a switching control signal Sc2 for electrically connecting the movable contact 54d to the third fixed contact 54c.

The second switching circuit 55 comprises a first fixed contact 55a connected to the movable contact 54d of the first switching circuit 54, a second fixed contact 55b connected to the emitter terminal of the transistor Q4 in the second level conversion circuit 52, and a movable contact 55c connected to the output side.

In this second switching circuit 55, as in the second switching circuit 44 in the luminance signal level conversion circuit 31, the movable contact 55c is switched based on a selection signal Ss from the microcomputer 201.

Specifically, as in the case of the second switching circuit 44 in the luminance signal level conversion circuit 31, when the external equipment is a VTR, a high-level selection signal Ss is sent from the microcomputer 201, so that the movable contact 55c in the second switching circuit 55 is electrically connected to the first fixed contact 55a, which sends out the output signal R-Y (the color difference signal in which the peak-to-peak level is any of 756 mV, 700 mV, and 525 mV) from the first switching circuit 54.

When the external equipment is a CCU, a low-level selection signal Ss is sent from the microcomputer 201, so that the movable contact 55c in the second switching circuit 55 is electrically connected to the second fixed contact 55b, which sends out an output signal R-Y (the color difference signal in which the peak-to-peak level is 525 mV) from the second level conversion circuit 52.

The color difference signal R-Y from the second switching circuit 55 turns to a color difference signal R-Y centered at 0 V at a coupling capacitor C2 at the next processing stage, and is output from an output terminal $\phi o2$.

With the other color difference signal level conversion circuit 33, when the external equipment is a VTR, a high-level selection signal Ss is sent from the microcomputer 201, so that the movable contact 55c in the second switching circuit 55 is electrically connected to the first fixed contact 55a, which sends out an output signal B-Y (the color difference signal in which the peak-to-peak level is any of 756 mV, 700 mV, and 525 mV) from the first switching circuit 54.

When the external equipment is a CCU, a low-level selection signal Ss is sent from the microcomputer 201, so that the movable contact 55c in the second switching circuit 55 is electrically connected to the second fixed contact 55b, which sends out an output signal B-Y (the color difference signal in which the peak-to-peak level is 525 mV) from the second level conversion circuit 52.

In this case as well, the color difference signal B-Y from the second switching circuit 55 turns to a color difference signal B-Y centered at 0 V at a coupling capacitor C2 at the next processing stage, and is output from an output terminal φo3.

In the above-described two color difference signal level conversion circuits 32 and 33, the color difference signals R-Y and B-Y sent from the first level conversion circuit 51 via a coupling capacitor C1 are sent to a separate circuit system (for example, a view finder driving circuit) via a contact b on a signal line between the coupling capacitor C1 and the third level conversion circuit 53.

Therefore, a luminance signal Y in which the white level is any of 714 mV, 700 mV, and 660.45 mV and color difference signals R-Y and B-Y centered at 0V in which the peak-to-peak level is 756 mV are supplied to the separate circuit system. Since the color difference signals are uniform, for example, when the color difference signal is again separated into R, G, and B color signals Sr, Sg, and Sb in the subsequent processing circuit, a simple circuit configuration can be used.

The setup level signal adding circuit 207 is comprised of a converter 61 which converts level control data (serial data) Dsu from the microcomputer 201 into a DC voltage Vsu at a level corresponding to the data value by analog conversion, a switching circuit 62 which selectively outputs the DC voltage Vsu from the converter 61 or a ground voltage Vss, an inverting type adder 64 composed of an operational amplifier 63, and a window pulse generating circuit 65. A 10-bit D/A converter for serial data, for example, can be used as the converter 61. The level control data Dsu is formed by the microcomputer 201 based on the aforementioned connected equipment information data Dmi and the signal-use location data.

Specifically, the level control data Dsu is valid when the external equipment connected to the camera adapter 3 is a VTR, and indicates a value corresponding to the appropriate standard (especially the standard for setup level) for the signal-use location indicated by the signal-use location data. Therefore, when the level control data Dsu is converted into analog data by the converter 61, a voltage signal Vsu with a DC level in accordance with a value that corresponds to the standard for the setup level is output from the converter 61.

On the other hand, when the external equipment is a CCU, the level control data Dsu is made invalid. In this case, data indicating "invalid" is prepared by the microcomputer 201 and output. The data indicating "invalid" is data indicating, for example, "000," "3FF," etc. in hexadecimal notation when the converter 61 is, for example, a 10-bit D/A converter.

Although the example using a 10-bit D/A converter as the converter 61 has been described above, a D/A converter having a ROM and memory control circuit therein may also be used. In this case, a conversion table (a table storing DC voltage values corresponding to the values of level control data Dsu) is stored in the storage area of the ROM, and a DC voltage value read from this conversion table is converted into an analog value and output as a voltage signal Vsu. As an example of the use of this conversion table, a value for the level control data Dsu is related to the record in the conversion table, and a DC voltage value can be determined from the record corresponding to such value.

The switching circuit 62 is comprised of a first fixed contact 62a connected to the output side of the converter 61, a second fixed contact 62b connected to GND, and a movable contact 62c connected to the output side (the input side of the inverting type adder 64). The movable contact 62c is switched based on a window pulse Pw1 from the window pulse generating circuit 65. For example, the movable contact 62c is switched to the first fixed contact 62a side for a certain period of time when the window pulse Pw1 is at a high level, and to the second fixed contact 62b side for a certain period of time when the window pulse Pw1 is at a low level.

The window pulse generating circuit 65 calculates a reference clock Pc from a clock generator 66 based on the input of a horizontal synchronizing signal HD from a synchronizing signal generating circuit 67, and generates and outputs a window pulse Pw1 which rises at the start time of the setup period for the luminance signal Y and falls at the end of the setup period. That is to say, the window pulse Pw1 generated by the window pulse generating circuit 65 is a pulse signal which is at a high level only for a period of time during which the setup level is being inserted. The clock generator 66 is composed of a quartz oscillator, a frequency dividing circuit, and the like. The synchronizing signal generating circuit 67 generates various synchronizing signals, such as a horizontal synchronizing signal, based on a reference clock Pc from the clock generator 66.

With the above configuration, for the period of time when the window pulse Pw1 output from the window pulse generating circuit 65 is at a high level, that is, during the setup period, a DC voltage Vsu from the converter 61 is supplied to the inverting type adder 64 at the next processing stage through the switching circuit 62, while during the rest of the time, a ground voltage Vss is supplied to the inverting type adder 64. However, when the level control data Dsu from the microcomputer 201 is "invalid" data, a ground voltage Vss is supplied to the inverting type adder 64 at the next processing stage even during the setup period.

In the above example, Japan, the United States, and Europe are assumed to be signal-use locations. The setup level of the luminance signal Y is 0% for Japan and Europe, and 7.5% for the United States (see attached Table 1). Actually, therefore, only when the signal-use location data stored in the EEPROM 129 of the picture pickup block 12 indicates the United States does the level control data Dsu become actually valid. That is to say, only when the signal-use location is the United States does the level control data Dsu take a value corresponding to 7.5% of the white level. When the signal-use location is Japan or Europe, that is 0% of white level, the data indicating the equivalent of "invalid" is supplied to the converter 61 as the level control data Dsu.

The inverting type adder 64, having a resistor Ra connected to the output side of the switching circuit 62, a resistor Rb connected to the next processing stage of the input terminal φia to which the luminance signal Y is supplied, an operational amplifier 63, and a feedback resistor Rf, is constructed so that the three resistors Ra, Rb, and Rf are connected to an inverting terminal of the operational amplifier 63 through a contact c. The non-inverting terminal of the operational amplifier 63 is grounded.

The output voltage Vo of the inverting type adder 64 is expressed as $$Vo = -\{(Rf/Ra)Vsu + (Rf/Rb)Y\}$$

Especially when R1=R2=Rf, $$Vo=-(Vsu+Y)$$

That is to say, the signal Vo output from an output terminal φoa has a signal form such that the voltage signal Vsu at the setup level is added to the luminance signal Y output from the level conversion circuit 206.

The composition circuit system 208 has a composition circuit 209, which adds a synchronizing signal to the luminance signal Y, forms a carrier chrominance signal by modulating the color difference signals R-Y and B-Y, and obtains a composite picture signal Sv by compounding the luminance signal to which a synchronizing signal is added and the carrier chrominance signal, and a signal adding circuit 210, which selectively adds various necessary signals to the composite picture signal output from the composition circuit 209. The description of the details of the composition circuit 209 are omitted because the circuit uses an well-known circuit configuration.

Figure 6:
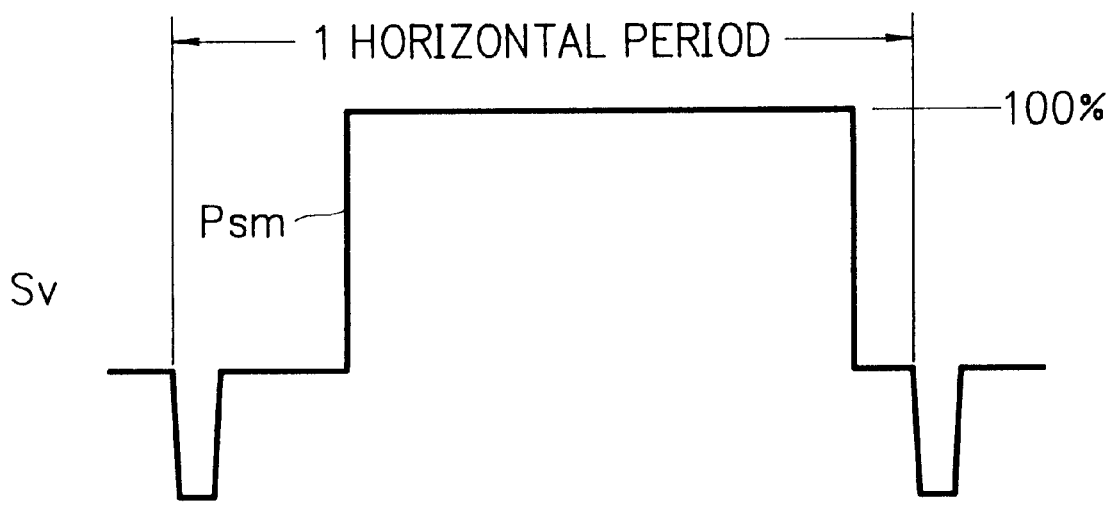
FIG. 6 is an illustration of a sample pulse in accordance with the present invention.

The signal adding circuit 210 comprises a sample pulse adding circuit 211 for adding a sample pulse Psm (see FIG. 6) for AGC for a vertical blanking period of composite picture signal formed in the composition circuit 209 at the prior processing stage, and a SYNC adding circuit 212 for adding a synchronizing signal SYNC to the output signal of the sample pulse adding circuit 211 for providing synchronization with the CCU. The sample pulse Psm is used to detect the attenuating state of the composite picture signal Sv.

Figure 7:
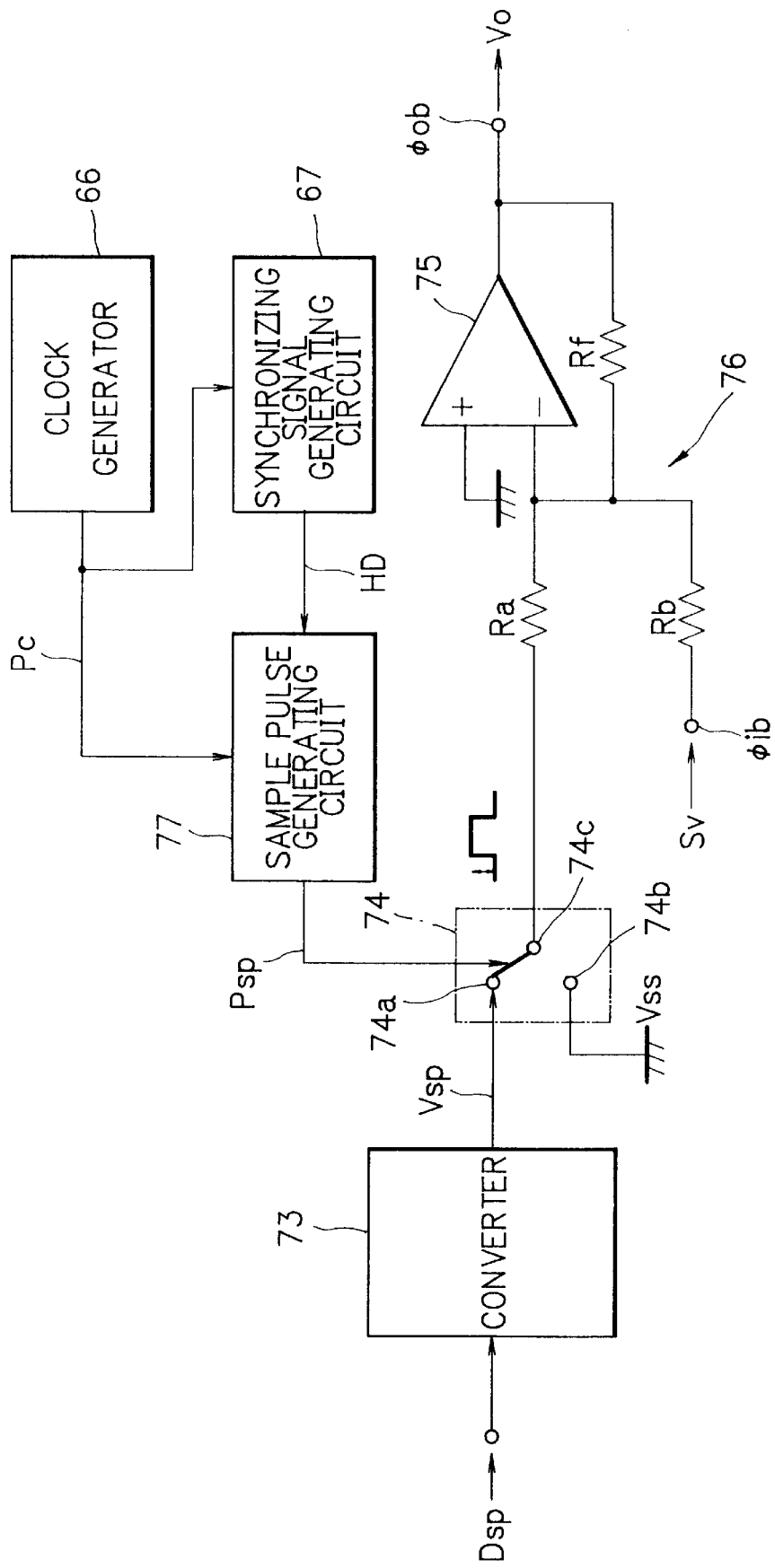
FIG. 7 is a circuit diagram showing a typical configuration of a sample pulse adding circuit incorporated in the camera body in accordance with the present invention.

The sample pulse adding circuit 211 has approximately the same configuration as that of the above-described setup level signal adding circuit 207. FIG. 7 shows a typical configuration of the sample pulse adding circuit 211.

The sample pulse adding circuit 211 is comprised of a converter 73 which converts the sample pulse data (serial data) Dsp from the microcomputer 201 into a DC voltage Vsp at a level corresponding to the data value by analog conversion, a switching circuit 74 which selectively outputs the DC voltage Dsp from the converter 73 or a ground voltage Vss, an inverting type adder 76 composed of an operational amplifier 75, and a sample pulse generating circuit 77.

The sample pulse data Dsp is generated in the microcomputer 201 based on pulse amplitude data (set by the CCU) from the signal input-output circuit 45 of the camera adapter 3 connected to the camera body 2. Specifically, the sample pulse data Dsp is valid when the external equipment connected to the camera adapter 3 is a CCU, and includes the pulse amplitude data Da. Therefore, when the sample pulse data Dsp is converted into analog data by the converter 73, a voltage signal Vsp having a DC level corresponding to the value of the pulse amplitude data Da included in the sample pulse data Dsp is output from the converter 73.

On the other hand, when the external equipment is a VTR, the sample pulse data Dsp is made invalid. In this case, data indicating "invalid" is prepared by the microcomputer 201 and output. The data indicating "invalid" is data indicating, for example, "000," "3FF," etc. in hexadecimal notation when the converter 73 is, for example, a 10-bit D/A converter. The configuration of the converter 73, as with the case of the setup level signal adding circuit 207, may be such that a D/A converter with a ROM (a conversion table is stored) which contains a memory control circuit may be used in place of the 10-bit D/A converter for serial data.

The switching circuit 74 is comprised of a first fixed contact 74a connected to the output side of the converter 73, a second fixed contact 74b connected to GND, and a movable contact 74c connected to the output side (the input side of the inverting type adder 76). The movable contact 74c is switched based on a sample pulse Psp from the sample pulse generating circuit 77. For example, the movable contact 74c is switched to the first fixed contact 74a side for the period of time when the sample pulse Psp is at a high level, and to the second fixed contact 74b side for the period of time when the sample pulse Psp is at a low level.

The sample pulse generating circuit 77 calculates the reference clock Pc from the clock generator 66 based on the input of a horizontal synchronizing signal HD from the synchronizing signal generating circuit 67, and generates and outputs a sample pulse Psp which rises at the start time of sample pulse adding period of the composite picture signal Sv and falls at the end of the sample pulse adding period. That is to say, the sample pulse Psp generated by the sample pulse generating circuit 77 is a pulse signal which is at a high level only during the sample pulse adding period.

With the above configuration, during the period of time when the sample pulse Psp output from the sample pulse generating circuit 77 is at a high level, that is, during the sample pulse adding period, a DC voltage Vsp from the converter 73 is supplied to the inverting type adder 76 at the next processing stage through the switching circuit 74, while during the rest of the time, a ground voltage Vss is supplied to the inverting type adder 76. However, when the sample pulse data Dsp from the microcomputer 201 is "invalid" data, a ground voltage Vss is supplied to the inverting type adder 76 at the next processing stage even during the sample pulse adding period.

Therefore, the signal Vo output from an output terminal φob of the inverting type adder 76 has a signal form such that the sample pulse Vsp, the level of which is variable, is added to the composite picture signal Sv supplied from the composition circuit 209 to an input terminal φib of the inverting type adder 76.

Usually, for a camera for broadcasting, a CCU is connected to the next processing stage of the video camera. When the cable length is compensated for by the CCU, the signal level is sometimes reduced depending on the type of equipment connected at the next processing stage after the CCU, and depending on the length of the cable, so that it is possible to imagine a case in which the sample pulse Psm itself disappears, and it becomes impossible to reproduce the composite picture signal Sv by means of the AGC.

However, in this example, the sample pulse Vsp, with an amplitude in accordance with the pulse amplitude set by, for example, an operator from the CCU, is added to the composite picture signal Sv, so that the disappearance of the sample pulse itself as described above can be avoided.

Figure 8:
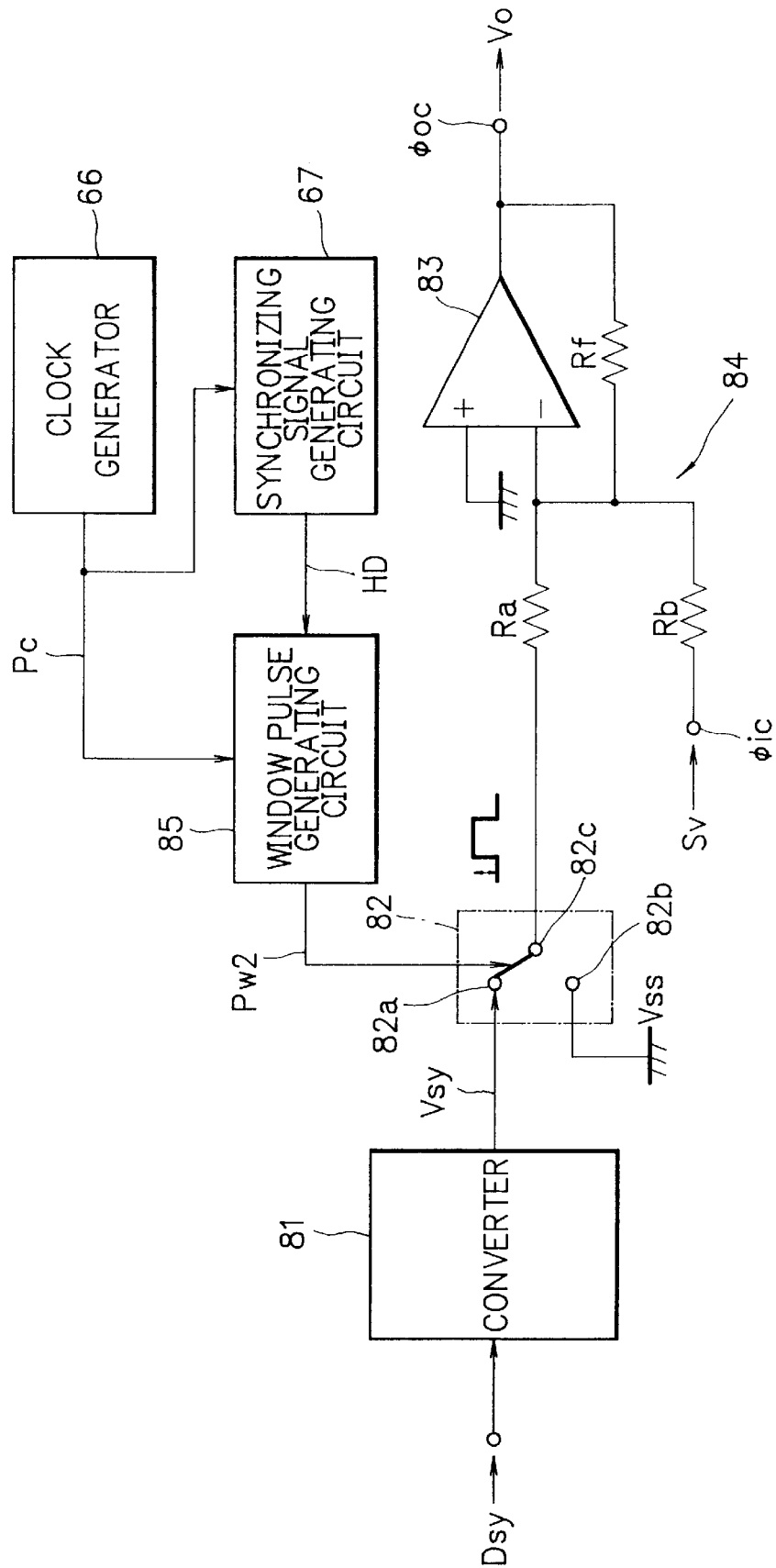
FIG. 8 is a circuit diagram showing a typical configuration of a SYNC adding circuit incorporated in the camera body in accordance with the present invention.

The SYNC adding circuit 212 has approximately the same configuration as that of the above-described sample pulse adding circuit 211. FIG. 8 shows a typical configuration of the SYNC adding circuit 212.

The SYNC adding circuit 212 is comprised of a converter 81 which converts the SYNC data (serial data) Dsy from the microcomputer 201 into a DC voltage Vsy of a level corresponding to the data value by analog conversion, a switching circuit 82 which selectively outputs the DC voltage Dsy from the converter 81 or a ground voltage Vss, an inverting type adder 84 composed of an operational amplifier 83, and a window pulse generating circuit 85.

The SYNC data Dsy is generated in the microcomputer 201 based on the aforementioned connected equipment information data Dmi. Specifically, the SYNC data Dsy is valid when the external equipment connected to the camera adapter 3 is a CCU, and has data in the form of SYNC amplitude data (different for each CCU) included in the connected equipment information data Dmi. Therefore, when the SYNC data Dsy is converted into analog data by the converter 81, a voltage signal Vsy having a DC level corresponding to the value of SYNC amplitude data included in the SYNC data Dsy is output from the converter 81.

On the other hand, when the external equipment is a VTR, the SYNC data Dsy is made invalid. In this case, data indicating "invalid" is prepared by the microcomputer 201 and output. The data indicating "invalid" is data indicating, for example, "000," "3FF," etc. in hexadecimal notation when the converter 81 is, for example, a 10-bit D/A converter. The configuration of the converter 81, as with the case of the sample pulse adding circuit 211, may be such that a D/A converter with a ROM (a conversion table is registered) which contains a memory control circuit therein may be used in place of the 10-bit D/A converter for serial data.

The switching circuit 82 is comprised of a first fixed contact 82a connected to the output side of the converter 81, a second fixed contact 82b connected to GND, and a movable contact 82c connected to the output side (the input side of the inverting type adder 84). The movable contact 82c is switched based on a window pulse Pw2 from the window pulse generating circuit 85. For example, the movable contact 82c is switched to the first fixed contact 82a side for the period of time when the window pulse Pw2 is at a high level, and to the second fixed contact 82b side for a period of time when the window pulse Pw2 is at a low level.

The window pulse generating circuit 85 calculates the reference clock Pc from the clock generator 66 based on the input of a horizontal synchronizing signal HD from the synchronizing signal generating circuit 67, and generates and outputs a window pulse Pw2 which rises at the start time of the SYNC adding period of the composite picture signal Sv and falls at the end time of the SYNC adding period. That is to say, the window pulse Pw2 generated by the window pulse generating circuit 85 is a pulse signal which is at a high level only during the SYNC adding period.

With the above configuration, for the period of time when the window pulse Pw2 output from the window pulse generating circuit 85 is at a high level, that is, during the SYNC adding period, a DC voltage Vsy from the converter 81 is supplied to the inverting type adder 84 at the next processing stage through the switching circuit 82, while during the rest of the time, a ground voltage Vss is supplied to the inverting type adder 84. However, when the SYNC data from the microcomputer 201 is "invalid" data, a ground voltage Vss is supplied to the inverting type adder 84 at the next processing stage even during the SYNC adding period.

Therefore, the signal Vo output from an output terminal φoc of the inverting type adder 84 has a signal form such that the synchronizing signal SYNC (DC voltage Vsy), the level of which is variable, is added to the composite picture signal Sv supplied from the sample pulse adding circuit 211 to an input terminal φic of the inverting type adder 76.

Figure 9:
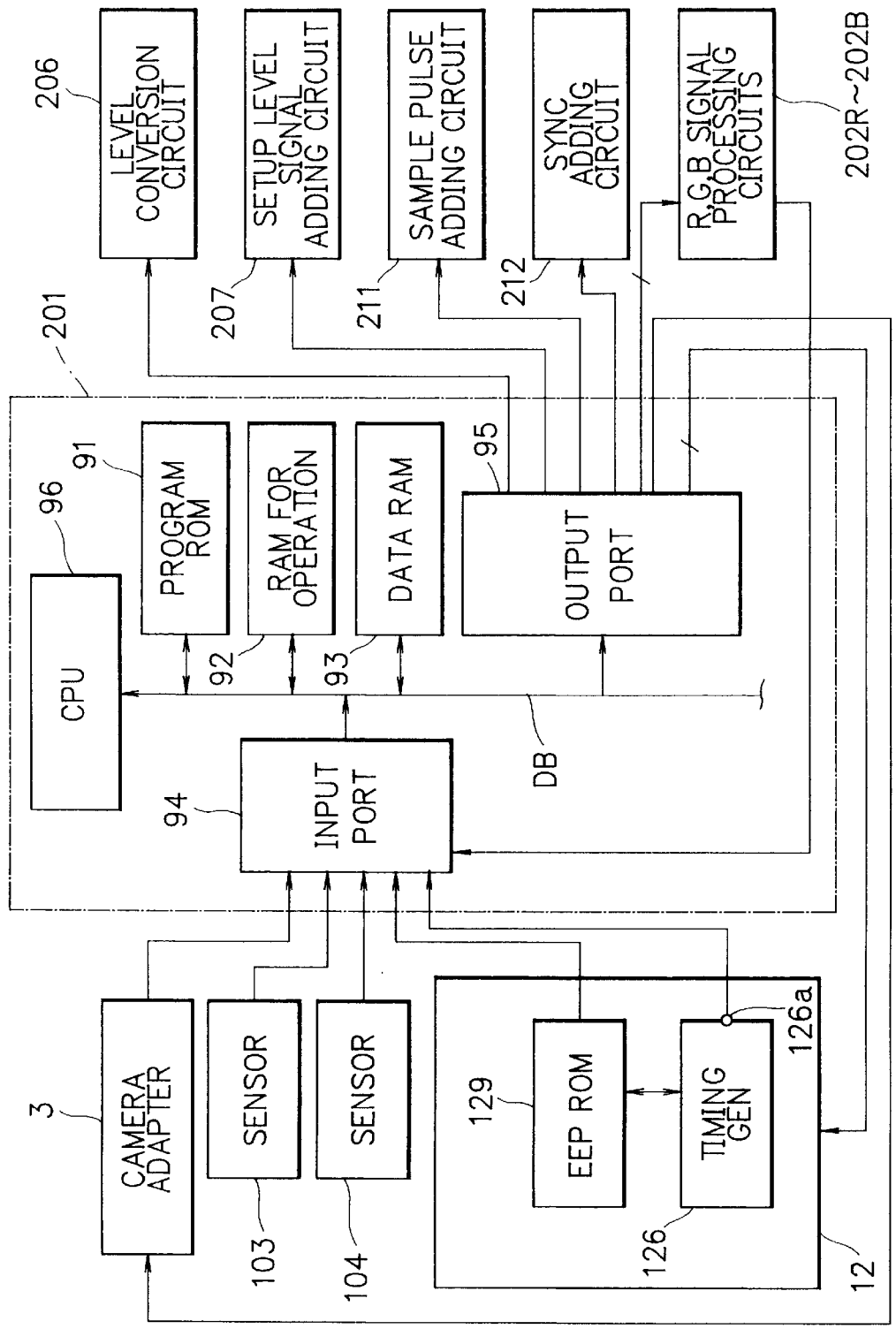
FIG. 9 is a block diagram showing the hardware configuration of a microcomputer incorporated in the camera body, together with external equipment and external circuits in accordance with the present invention.

The configuration and operation of the microcomputer 201 is described below with reference to FIGS. 9 to 14. FIG. 9 shows a hardware configuration of the microcomputer 201. The microcomputer 201 is comprised of a program ROM 91 for storing various programs, a RAM for operation 92 which is used for the operation of a program read from the program ROM 91, a data RAM 93 for storing various data from the signal input-output circuit 45 of the camera adapter 3 and the EEPROM 129 in the picture pickup block 12 of the optical head body 1, data processed by a program, etc., an input port and an output port for providing input/output of data for the picture pickup block 12 of the optical head body 1 and the external circuits (level conversion circuit 206, setup level signal adding circuit 207, sample pulse adding circuit 211, SYNC adding circuit 212, and processing circuits 202R, 202G, and 202B), and a CPU (control unit and logic unit) for controlling these various circuits.

The aforementioned circuits controlled by the CPU 96 are so constructed that data is transmitted between these circuits via a data bus DB derived from the CPU 96, and the circuits are controlled by the CPU 96 via a control bus (not shown) derived from the CPU 96.

The connected equipment information data Dmi input from the signal input-output circuit 45 of the camera adapter 3 via an interface bus and the setup data input from the EEPROM 129 in the picture pickup block 12 via an interface bus are supplied to the data bus DB via the input port 94. The data stored in the data RAM 93 is supplied to the external circuits via the output port 95.

The operation of a video camera in this example, in particular the operation of the microcomputer 201, is next described with reference to the functional block diagram shown in FIG. 10 and the flowcharts shown in FIGS. 11 to 14.

Figure 11:
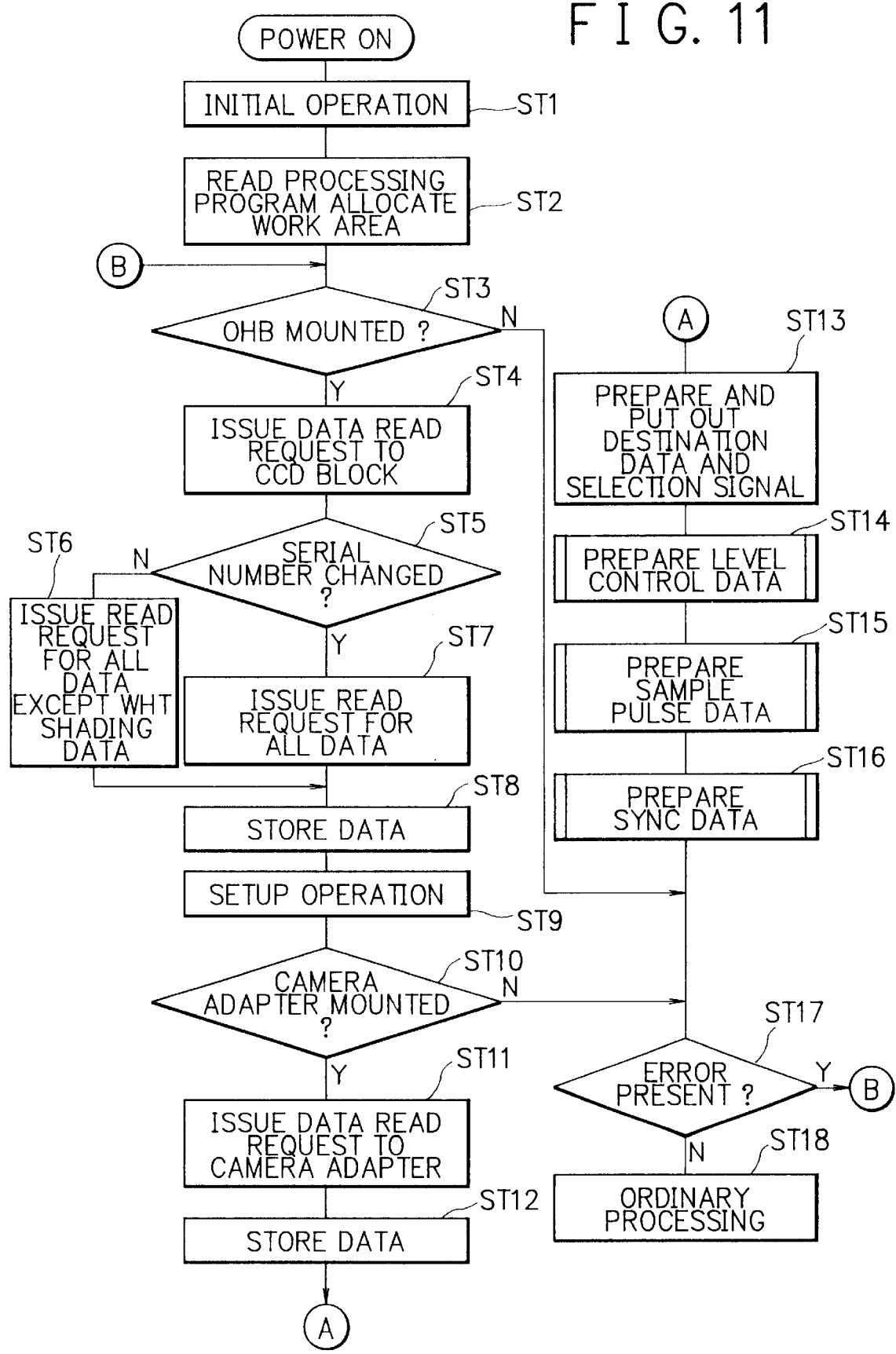
FIG. 11 is a flowchart showing the operation of the switching processing means in accordance with the present invention.

First, in Step ST1, shown in FIG. 11, initial operations such as system check and memory check in the video camera and initialization of hardware are performed when the power is turned on.

Then, In Step ST2, a switching processing program, which is the switching processing means 101 for performing switching operations for the external circuits, is read from the program ROM 91, and at the same time, a work area used for temporary storage of data generated in the operation of the switching processing program and for transmission of parameters between routines composing the switching processing program is allocated in the RAM for operation 92.

Also, an area in which the setup data (see attached Table 2) read from the EEPROM 129 in the picture pickup block 12 of the optical head body 1 is stored, an area in which the connected equipment information data Dmi from the ROM 45a incorporated in the signal input-output circuit 45 of the camera adapter 3 is stored, an area in which the pulse amplitude data Da sent from the CCU via the camera adapter 3 is stored, and so on are all allocated in the data RAM 93.

Figure 10:
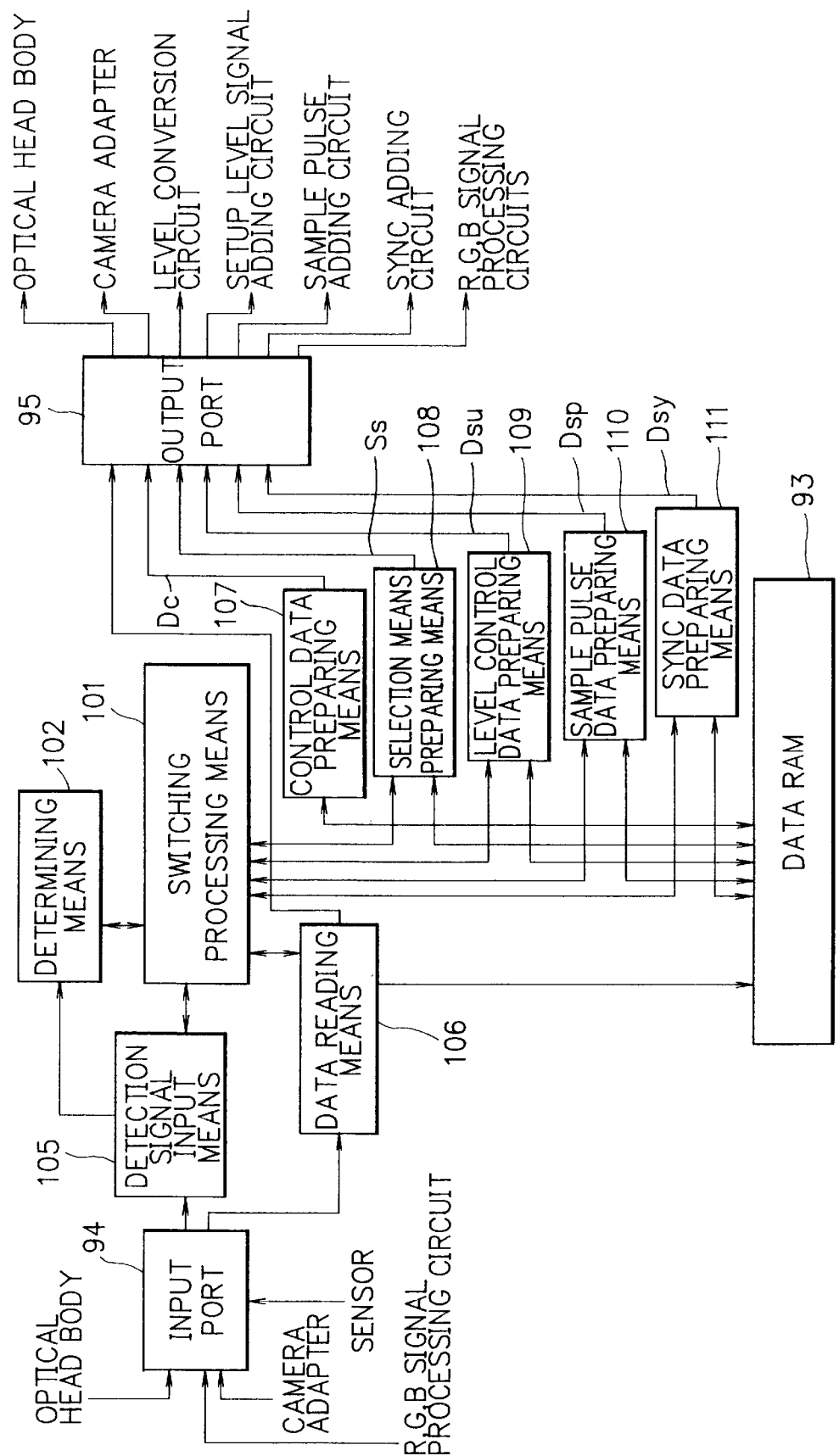
FIG. 10 is a functional block diagram showing the operation of switching processing means in accordance with the present invention.

As shown in FIG. 10, the switching processing program 101 written in the RAM for operation 92 includes a determining means 102 for making determinations, a detection signal input means 105 for inputting a detection signal from sensors 103 and 104 (see FIG. 9) for detecting the mounting state of the optical head body 1 and the camera adapter 3 and a level detection signal from a level detector 321 in the processing circuits 202R, 202G, and 202B of the camera body 2, and a data reading means 106 which reads the setup data from the EEPROM 129 in the picture pickup block 12 of the optical head body 1 and the connected equipment information data Dmi from the RON 45a incorporated in the signal input-output circuit 45 of the camera adapter 3, and stores them in the corresponding areas.

The switching processing program 101 also has a control data preparing means 107, which outputs the setup data for controlling the operation of the picture pickup block of the optical head body 1 and the processing circuits 202R, 202G, and 202B of the camera body 2 or the control data such as the signal-use location data Dc prepared from the setup data based on various data read from the EEPROM 129 and stored in the data RAM 93 and a level detection signal from the level detector 321, and a selection signal preparing means 108, which prepares and outputs a selection signal Ss based on the connected equipment information data Dmi read from the ROM 45a incorporated in the signal input-output circuit 45 of the camera adapter 3 and stored in the data RAM 93.

Further, the switching processing program 101 has a level control data preparing means 109, which prepares and outputs the level control data Dsu based on the connected equipment information data Dmi and the signal-use location data, a sample pulse data preparing means 110, which prepares and outputs the sample pulse data Dsp based on the connected equipment information data Dmi and the pulse amplitude data Da, and a SYNC data preparing means 111, which prepares and outputs the SYNC data Dsy based on the connected equipment information data Dmi and the signal-use location data.

The switching processing program 101, in the next step or Step ST3, determines whether or not the optical head body (OHB) 1 is mounted on the camera body 2 through the determining means 102. This determination is made on the basis of the detection signal supplied from the sensor 103 for detecting the mounting of the optical head body 1 through the detection signal input means 105. For example, if the optical head body 1 is not mounted on the camera body 2, a low-level detection signal is input, while if it is mounted, a high-level detection signal is input. With this determining means 102, therefore, a determination can be made as to whether or not the optical head body 1 is mounted, based on the level of the inputted detection signal.

The determination of whether or not the optical head body (OHB) is mounted on the camera body 2 is not only made by the detection signal from the sensor 103, but may also be made according to whether or not the data shows the picture pickup element being either the IT type or the FIT type, which is obtained at the terminal 126a for the timing generator 126.

When the optical head body 1 is mounted, the control process advances to the next step or Step ST4, where a request for reading serial number data (see attached Table 2) for the picture pickup block (CCD block) 12 (read command) is output, via the output port 95, to the EEPROM 129 in the picture pickup block 12 of the optical head body 1 through the data reading means 106. Thereafter, the serial number data of the picture pickup block 12 is read from the EEPROM 129 and sent to the microcomputer 201 side.

In Step ST5, it is determined whether or not the serial number of the picture pickup block 12 has been changed from that of the previous operation. If the serial number has not been changed, in Step ST6, a request for reading all data except the white shading data (read command) is output, via the output port 95, to the EEPROM 129 in the picture pickup block 12 of the optical head body 1 through the data reading means 106. Thereafter, all data except the white shading data are read from the EEPROM 129 and sent to the microcomputer 201 side.

On the other hand, if the serial number has been changed, in Step S7, a request for reading all data (read command) is output, via the output port 95, to the EEPROM 129 in the picture pickup block 12 of the optical head body 1 through the data reading means 106. Thereupon, all data are read from the EEPROM 129 and sent to the microcomputer 201 side.

The white shading data consists of a large quantity of data, so that it takes some time to read the white shading data from the EEPROM 129. Therefore, it is read only when the serial number has been changed. Incidentally, the data RAM 93 of the microcomputer 201 is backed up by, for example, a battery, so that the memory is maintained even when the power is off.

In Step ST8, the setup data sent from the EEPROM 129 in the picture pickup block 12 as described above is read via the input port 94 through the data reading means 106, and the read setup data is stored in the RAM 93.

In Step ST9, a setup operation is performed on the basis of the setup data stored in the data RAM 93. In this case, the setup operation is executed by supplying the setup data via the output port to the picture pickup block 12 of the optical head body 1, the processing circuits 202R, 202G, and 202B of the camera body 2, and so on, through the control data preparing means 107.

For example, the substrate clock voltage data and the reset gate clock voltage data for the picture pickup elements 121R, 121G, and 121B stored in the EEPROM 129 are supplied to the CCD driver 122 for the picture pickup block 12, and the substrate clock voltage Vsub and the reset gate clock voltage Vrg are set to set up the CCD driver 122. Also, the VCO offset data stored in the EEPROM 129 is supplied to the voltage control oscillator 125 for the picture pickup block 12 to set up the voltage control oscillator 125 in such a manner that the frequency of reference clock is constant. The BLK offset data stored in the EEPROM 129 is supplied to the timing generator 126 for the picture pickup block 12, which supplies the offset data for making dark correction from the timing generator 126 to the preamp circuits 123R, 123G, and 123B to set up the preamplifiers 123R, 123G, and 123B.

The white offset data stored in the EEPROM 129 is supplied to the gain control amplifiers 305R and 305B of the camera body 2 to set up these gain control amplifiers 305R and 305B. Also, the white shading data stored in the EEPROM 129 is supplied to the white shading generator 311. Based on this, the correction waveform signal corresponding to the white shading of the picture pickup elements 121R, 121G, and 121B is supplied from the white shading generator 311 to set up the white shading correction circuits 310R, 310G, and 310B. The masking data stored in the EEPROM 129 is supplied to the linear matrix circuit 314 to set up the linear matrix circuit 314. The aspect ratio data stored in the EEPROM 129 is supplied to the cutout circuit 203 and the electronic view finder 205 to set up the cutout circuit 203 and the electronic view finder 205.

In Step ST10, a determination ia made through the determining means 102 whether or not the camera adapter 3 is mounted on the camera body 2. This determination is made based on the detection signal from the sensor 104 for detecting the mounting of the camera adapter 3, which is supplied through the detection signal input means 105. For example, if the camera adapter 3 is not mounted on the camera body 2, a low-level detection signal is input, while if it is mounted, a high-level detection signal is input. In this determining means 102, therefore, whether or not the camera adapter 3 is mounted is determined by the level of the inputted detection signal.

If the camera adapter 3 is mounted, the control process advances to the next step or Step ST11, where a request for reading the connected equipment information data Dmi showing the type of connected equipment (read command) is output, via the output port 95, to the signal input-output circuit 45 of the camera adapter 3 through the data reading means 106. The signal input-output circuit 45 of the camera adapter 3 reads the connected equipment information data Dmi from the built-in ROM 45a and sends it to the microcomputer 201 side upon a data read request from the microcomputer 201.

In Step ST12, the connected equipment information data Dmi sent from the camera adapter 3 is read via the input port 94 through the data reading means 106 and the read connected equipment information data Dmi is stored in the data RAM 93.

In Step ST13, the signal-use location data Dc and the selection data Ss to be sent to the level conversion circuit 206 for the setup operation are prepared through the control data preparing means 107 and the selection signal preparing means 108 and output to the level conversion circuit via the output port 95.

Specifically, the signal-use location shown by the signal-use location data read from the EEPROM 129 in the picture pickup block 12 and stored in the data RAM 93 in the microcomputer 201 is converted into a single code in order to prepare the signal-use location data Dc. For example, if the signal-use location is Japan, code "01" is prepared as the signal-use location data Dc. If the signal-use location is the United States, code "10" is prepared, and if the signal-use location is Europe, code "11" is prepared. This code is supplied to the switching control circuits 34 and 35 in the level conversion circuit 206 via the output port 95.

Based on the connected equipment information data Dmi stored in the data RAM 93 in the microcomputer 201, a high-level or low-level selection signal Ss is prepared. For example, if the connected equipment information data Dmi shows a VTR, a high-level selection signal Ss is provided, while if the connected equipment information data Dmi shows a CCU, a low-level selection signal is provided. This selection signal Ss is supplied to the second switching circuits 44 and 55 in the level conversion circuit 206 via the output port 95.

In the camera body 2, the picture pickup signals from the picture pickup elements 121R, 121G, and 121B for the picture pickup block 12 of the optical head body 1 at the prior processing stage are processed at the processing circuits 202R, 202G, and 202B, respectively, and converted into R, G, and B color signals Sr, Sg, and Sb. Further, these color signals Sr, Sg, and Sb are converted into the luminance signal Y and color difference signals R-Y and B-Y in the matrix circuit at the next processing stage.

The luminance signal Y and color difference signals R-Y and B-Y are converted into a level corresponding to the signal-use location in the level conversion circuit 206 at the next processing stage. That is to say, in the level conversion circuit 206, as described above, the signal-use location data Dc is supplied to the switching control circuits 34 and 35 by the process in Step ST13, and the selection signal Ss is supplied to the second switching circuits 44 and 55.

When the selection signal Ss indicates a CCU, that is, in the case of low-level signal, the luminance signal Y, the white level of which is 700 mV, from the second level conversion circuit 43, is output through the second switching circuit 44. For the color difference signals R-Y and B-Y, the color difference signals R-Y and B-Y, the peak-to-peak level of which is 525 mV, from the second level conversion circuit 52, are output through the second switching circuit 55.

On the other hand, when the selection signal Ss indicates a VTR, that is, in the case of high-level signal, the luminance signal Y of the white level selected in the first level conversion circuit 41 and the first switching circuit 42 based on the switching control signal Sc1 from the switching control circuit 34, that is, the luminance signal Y, the white level of which is 714 mV when the content of signal-use location data Dc from the microcomputer 201 indicates the signal-use location of Japan, 660.45 mV when it indicates the signal-use location of the United States, and 700 mV when it indicates the signal-use location of Europe, is output through the second switching circuit 44.

The color difference signals R-Y and B-Y of the peak-to-peak level selected in the third level conversion circuit 53 and the first switching circuit 54 based on the switching control signal Sc2 from the switching control circuit 35, that is, the color difference signals R-Y and B-Y, the peak-to-peak level of which is 700 mV when the content of signal-use location data Dc from the microcomputer 201 indicates the signal-use location of Japan, 756 mV when it indicates the signal-use location of the United States, and. 525 mV when it indicates the signal-use location of Europe, are output through the second switching circuit 55.

Figure 12:
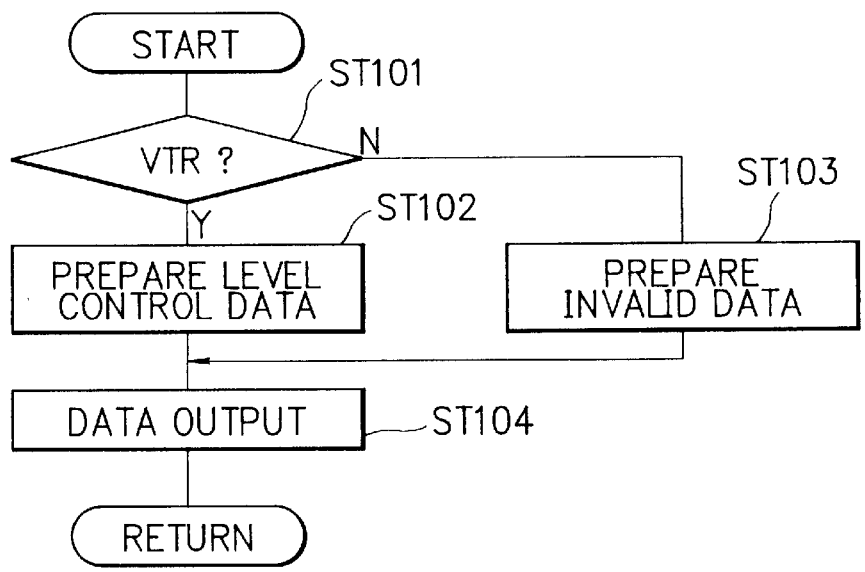
FIG. 12 is a flowchart showing the operation of the level control data preparing means in accordance with the present invention.

Returning to the explanation of the flowchart, in the next step or Step ST14, the control process goes into a level control data preparing subroutine, which is a level control data preparing means 109. In this subroutine, as shown in FIG. 12, first, in Step ST101, it is determined through the determining means 102 whether or not the external equipment connected to the camera adapter 3 is a VTR. This determination is made on the basis of the content of connected equipment information data Dmi stored in the data RAM 93 in the microcomputer 201.

When the content of the connected equipment information data Dmi shows a VTR, the control process advances to the next step or Step ST102, where the level control data Dsu is prepared. Specifically, in connection with the signal-use location data, the value corresponding to the standard of setup level (0% of white level for Japan and Europe, 7.5% of white level for the United States) is made into 10-bit serial data, and is deemed the level control data Dsu.

If it is concluded in Step ST101 that the external equipment is a CCU, the control process advances to Step ST103, where invalid data is prepared. Specifically, 10-bit serial data of "000" or "3FF" in hexadecimal notation is taken as invalid data. In Step ST102 described above, when the signal-use location is Japan or Europe, "000" in hexadecimal notation is the level control data Dsu, so that it is equivalent to invalid data.

After the process in Step ST102 or ST103 is completed, the control process advances to the next step or Step ST104, where the level control data Dsu or the invalid data is output to the converter 61 for the setup level signal adding circuit 207 via the output port 95, where the level control data preparing subroutine terminates.

Through the processing of the above-described level control data preparing means 109, a voltage signal of the setup level (level of 7.5% of white level) is added to the luminance signal Y if the external equipment connected to the camera adapter 3 is a CCU and only when the signal-use location is the United States. Thereafter, the white level of the luminance signal for the United States becomes 714 mV.

Figure 13:
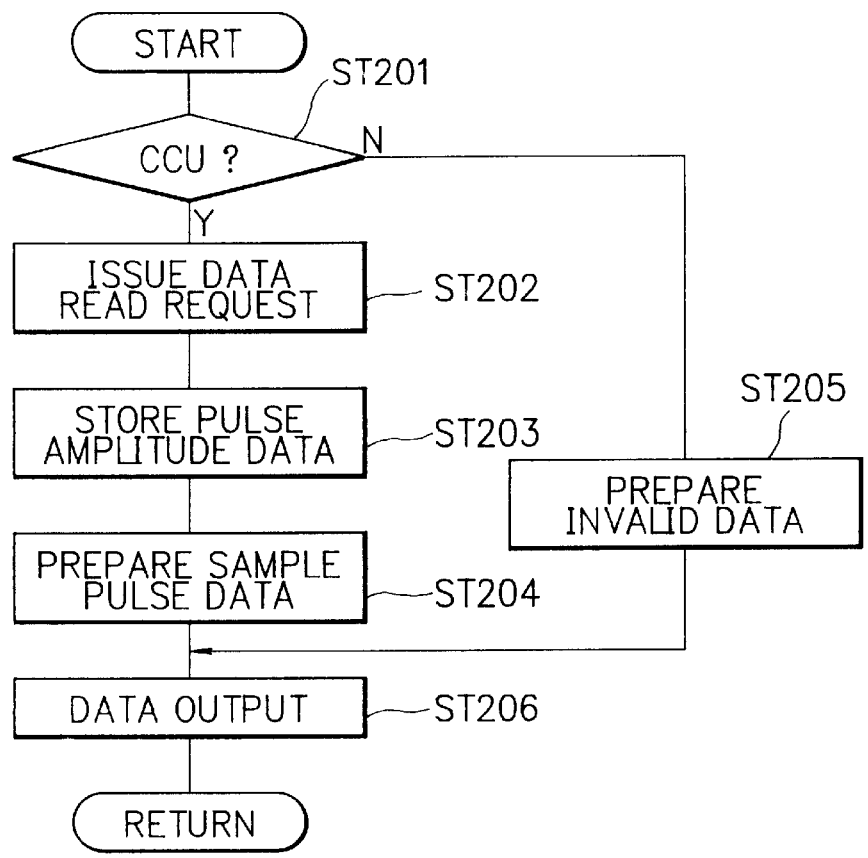
FIG. 13 is a flowchart showing the operation of the sample pulse data preparing means in accordance with the present invention.

Returning to the main routine shown in FIG. 11, in the next step or Step ST15, the control process goes into a sample pulse data preparing subroutine, which is a sample pulse data preparing means 110. In this subroutine, as shown in FIG. 13, first, in Step ST201, it is determined through the determining means 102 whether or not the external equipment connected to the camera adapter 3 is a CCU. This determination is made on the basis of the content of the connected equipment information data Dmi stored in the RAM 93 in the microcomputer 201.

When the content of the connected equipment information data Dmi is a CCU, the control process advances to the next step or Step ST202, where a request for reading pulse amplitude data Da (read command) is output, via the output port 95, to the signal input-output circuit 45 of the camera adapter 3 through the data reading means 106. The signal input-output circuit 45 of the camera adapter 3 sends the pulse amplitude data Da, which is supplied from the CCU, to the microcomputer 201 side upon a data read request from the microcomputer 201.

In Step ST203, the pulse amplitude data Da sent from the camera adapter 3 is read via the input port 94 through the data reading means 106, and the read pulse amplitude data Da is stored in the data RAM 93.

In Step ST204, the sample pulse data Dsp is prepared. Specifically, the value of the pulse amplitude data Da stored in the data RAM 93 is made into 10-bit serial data, being taken as the sample pulse data Dsp.

In Step ST201, if it is concluded that the external equipment is a VTR, the control process advances to Step ST205, where invalid data is prepared. Specifically, 10-bit serial data of "000" or "3FF" in hexadecimal notation is made invalid data.

After the process in Step ST204 or ST205 is completed, the control process advances to the next step or Step ST206, where the sample pulse data Dsp or the invalid data is output to the converter 73 for the sample pulse adding circuit 211 via the output port 95, which terminates the sample pulse data preparing subroutine.

Through the processing of the sample pulse data preparing means 110 a sample pulse of an amplitude in accordance with the pulse amplitude of the sample pulse set by the CCU is added to the composite picture signal Sv from the composition circuit 209 if the external equipment connected to the camera adapter 3 is a CCU.

Figure 14:
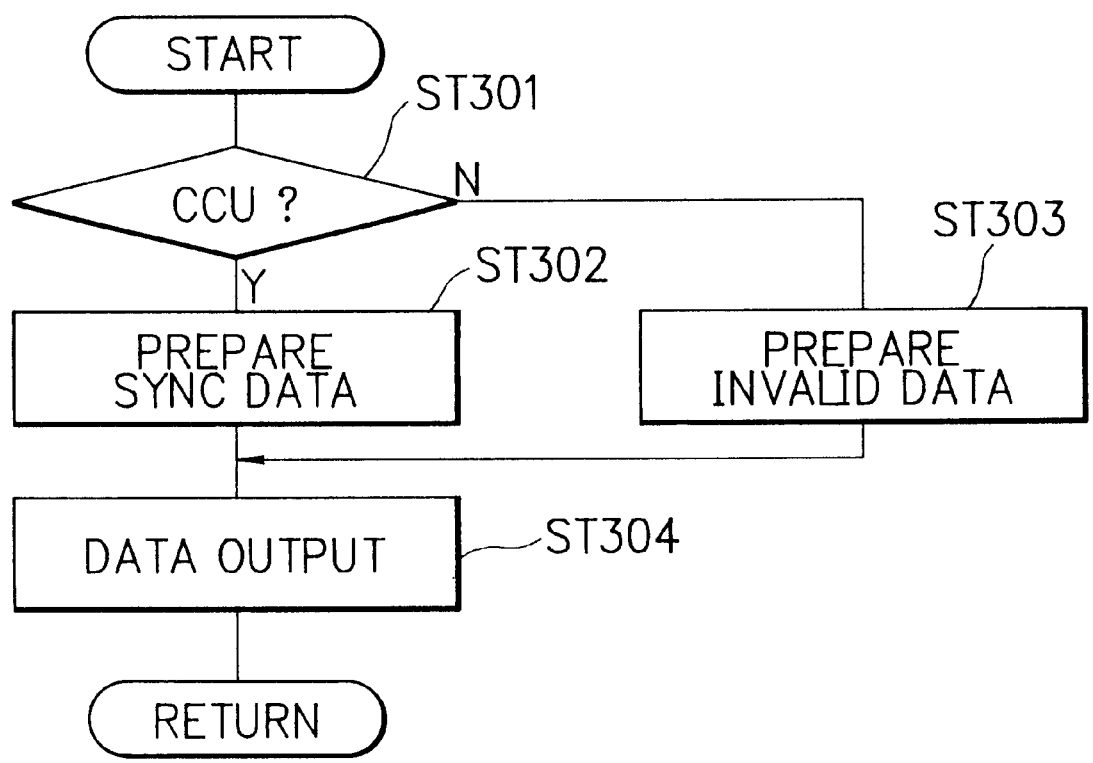
FIG. 14 is a flowchart showing the operation of SYNC data preparing means in accordance with the present invention.
Figure 17A:
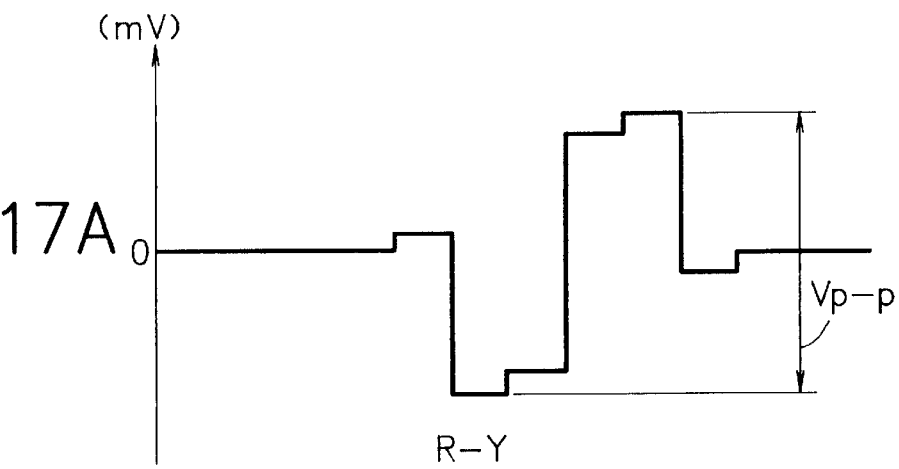
FIGS. 17A and 17B are waveform diagrams showing examples of the horizontal waveforms of color difference signals R-Y and B-Y.
Figure 17B:
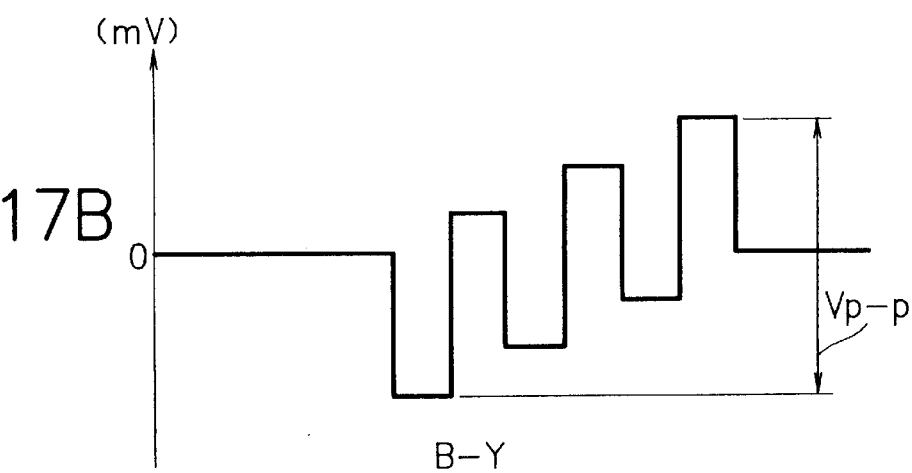

Returning to the main routine shown in FIG. 11, in the next step or Step ST16, the control process goes into a SYNC data preparing subroutine, which is a SYNC data preparing means 111. In this subroutine, as shown in FIG. 14, first, in Step ST301, it is determined through the determining means 102 whether or not the external equipment connected to the camera adapter 3 is a CCU. This determination is made on the basis of the content of the connected equipment information data Dmi stored in the RAM 93 in the microcomputer 201.

When the content of the connected equipment information data Dmi shows a CCU, the control process advances to the next step or Step ST302, where the SYNC data Dsy is prepared. Specifically, the value of the SYNC amplitude data included in the connected equipment information data Dmi is made into 10-bit serial data, and is deemed the SYNC data Dsy.

In Step ST301, if it is concluded that the external equipment is a VTR, the control process advances to Step ST303, where invalid data is prepared. Specifically, 10-bit serial data of "000" or "3FF" in hexadecimal notation is made invalid data.

After the processing in Step ST302 or ST303 is completed, the control process advances to the next step or Step ST304, where the SYNC data Dsy or the invalid data is output to the converter 81 of the SYNC adding circuit 212 via the output port 95, which terminates the SYNC data preparing subroutine.

Through the processing of the SYNC data preparing means 111, the synchronizing signal SYNC with an amplitude corresponding to the CCU connected to the camera adapter 3 is added to the composite picture signal Sv if the external equipment connected to the camera adapter 3 is a CCU.

Returning to the main routine shown in FIG. 11, in the next step or Step ST17, it is determined whether or not an error has occurred in the processes for each step described above. If the optical head body 1 is not mounted as determined in Step ST3 described above, or if the camera adapter 3 is not mounted as determined in Step ST10, it is concluded that an error has occurred. If it is concluded in Step ST17 that no error has occurred, the control process advances to Step ST18, where the setup operation terminates, and the ordinary processing is started. On the other hand, if it is concluded in Step ST17 that an error has occurred, the control process returns to Step S3, and the processing for the aforementioned steps is repeated.

Through the operation of the CCU (actually, a control panel connected to the CCU) connected to the microcomputer 201 via the camera adapter 3, the control data in accordance with the operation of the CCU is supplied from the microcomputer 201 to each circuit in the picture pickup block 12 of the optical head body 1 and in the camera body 2 when the power is turned on.

Thereupon, the timing generator 126 can be supplied with the control data for controlling the shutter time for an electronic shutter and the reading system, such as field reading or frame reading. Also, the timing generator 126 can be supplied with the control data for dark correction. The dark correction is made by supplying the offset data for dark correction from the timing generator 126 to the preamp circuits 123R, 123G, and 123B. The voltage control oscillator 125 can be supplied with the control data for regulating the frequency of the reference clock, so that the frequency of the reference clock can be regulated. The filter disk unit 128 can be supplied with the control data for switching the ND filter and CC filter. The gain select circuits 306R, 306G, and 306B can be supplied with the control data for performing gain selection. By supplying control data to the black shading generator 303, a correction waveform signal, which can properly correct black shading etc., can be formed.

The gain control amplifiers 305R, 305G, and 305B can be supplied with the control data for correcting the shift of balance of R, G, and B color signals due to the insertion of the ND filter or for adjusting white balance. By supplying control data to the white shading generator 311, a correction waveform signal, which can properly correct white shading etc., can be formed. The flare correction circuits 312R, 312G, and 312B can be supplied with the control data for performing flare correction, and the linear matrix circuit 314 can be supplied with the control data for performing correction processing.

The data which is read from the EEPROM 129 in the picture pickup block 12 and supplied to the microcomputer 201 in the camera body 2 may be supplied to the aforementioned CCU and displayed. Also, the white shading data, VCO offset data of the voltage control oscillator, masking sit data showing the color separation characteristics of color separation prism, white offset data when the ND filter is inserted, and other data which are changed by the operation of the CCU when the power is on as described above can be stored in the EEPROM 129 in the picture pickup block 12 from the microcomputer 201 in the camera body 2. This can be done by commanding storage through the operation of the CCU. Thereafter, the optimum setup data suitable for the characteristics of the picture pickup elements 121R, 121G, and 121B, color separation prism 120, etc., composing the picture pickup block 12 can be stored in the EEPROM 129 in the picture pickup block 12. When the power is on, the data of the filter being used and other data may be displayed in the electronic view finder 205 as necessary based on the ND filter data, CC filter data, color temperature data, and IR filter data stored in the EEPROM 129.

As described above, in this example, the setup data stored in the EEPROM 129 in the picture pickup block 12 is read by the microcomputer 201 of the camera body 2 when the power is turned on, and each circuit in the picture pickup block 12 and the camera body 2 is controlled on the basis of the setup data, and the setup is automatically carried out.

Thereafter, in the CCD driver 122 of the picture pickup block 12, the bias voltage of the substrate clock voltage Vsub and reset gate clock voltage Vrg is set based on the substrate clock voltage data and reset gate clock voltage data stored in the EEPROM 129. In the voltage control oscillator 125 of the picture pickup block 12, the frequency of the reference clock is set to be constant based on the VCO offset data stored in the EEPROM 129. In the preamp circuits 123R, 123G, and 123B of the picture pickup block 12, the dark correction is made by the offset data for dark correction supplied from the timing generator 126 based on the BLK offset data stored in the EEPROM 129.

In the gain control amplifiers 305R, 305G, and 305B of the camera body 2, the shift of balance of R, G, and B color signals due to the insertion of the ND filter is corrected based on the white offset data stored in the EEPROM 129. In the white shading correction circuits 310R, 310G, and 310B, the white shading correction is made by the correction waveform signal of white shading generated from the white shading generator 311 based on the white shading data stored in the EEPROM 129. In the linear matrix circuit 314, the difference in tint due to the variations in spectral sensitivity of the color separation prism 120 is corrected based on the masking data stored in the EEPROM 129. In the microcomputer 201, the setting of detection frame in iris adjustment and the white balance adjustment and the like are performed based on the data concerning the aspect ratio of the picture pickup elements 121R, 121G, and 121B stored in the EEPROM 129.

For this reason, even when the picture pickup block 12 is replaced, the items relating to the setup stored in the EEPROM 129 need not be adjusted on the camera body 2 side. Therefore, the user can easily replace the picture pickup block 12, and the replacement of the applicable picture pickup block 12, based on the application, can be carried out easily.

In this example, the picture pickup block 12 has, in the EEPROM 129, the data for correcting the variations in the characteristics of the picture pickup elements 121R, 121G, and 121B and the optical system, so that the picture pickup block 12, being of a self-contained type, can be handled as one item, and moreover can be used as is even when the camera body 2 is digitized.

Also, in this example, in the level conversion circuit 206 connected to the next processing stage of the matrix circuit 204, the white level of the luminance signal Y and the peak-to-peak levels of the color difference signals R-Y and BEY from the matrix circuit 204 are converted into a level corresponding to the appropriate signal-use location. Therefore, a plurality of circuit boards for different signal-use locations need not be prepared, and the configuration of the camera body including the circuit board can be made uniform, leading to the improvement in productivity of the video camera. Also, the need for a troublesome work in which the circuit board is replaced with one conforming to the standard appropriate for a specific signal-use location each time the signal-use location is changed is eliminated, leading to improvement in serviceability of the video camera.

Further, in this example, the sample pulse adding circuit 211, which adds the sample pulse for AGC, used for detecting the attenuation level in the transmission of composite picture signal Sv, to the composite picture signal Sv, is connected at the next processing stage of the composition circuit 209. Therefore, a circuit for adding the sample pulse, currently incorporated to now in the camera adapter 3, can be omitted, which decreases the cost of the camera adapter 3.

Usually, for a camera for broadcasting, a CCU is connected at the next processing stage of the video camera. When a cable length is compensated for by the CCU, the signal level is sometimes reduced depending on the type of equipment connected at the next processing stage of the CCU, and depending the length of the cable, so that it is possible to imagine a case in which the sample pulse itself may disappear, and it becomes impossible to reproduce the composite picture signal Sv by means of the AGC.

In this example, however, a level changeable means (comprised of the converter 73, switching circuit 74, sample pulse generating circuit 77, etc.) is provided which can continuously change the level of sample pulse to the level set by the CCU. Therefore, the level of the sample pulse can be changed in accordance with the level set by the CCU by such level changeable means. As a result, disappearance of the sample pulse itself can be avoided, and the cable length can be compensated for properly in the CCU.

Moreover, as described above, the addition of a sample pulse is made in the sample pulse adding circuit 211 in the camera body 2, not in the camera adapter 3, and the level conversion of the composite picture signal Sv is performed in the camera body 2 according to the signal-use location. Therefore, the readjustment of the signal is not needed, so that matrix errors caused by improper readjustment, etc., can be reduced.

Also, in this example, the SYNC adding circuit 212, which adds the synchronizing signal SYNC for providing synchronization with the CCU to the composite picture signal Sv, is connected at the next processing stage of the composition circuit 209, and a level changeable means (comprised of the converter 81, switching circuit 82, window pulse generating circuit 85, etc.) is provided which can continuously change the level of the synchronizing signal SYNC being added to the level set by the CCU. Therefore, this camera can be connected to any CCU, providing additional flexibility to the camera.

The picture pickup block 12 with the CCD solid-state picture pickup elements 121R, 121G, and 121B has been described in the above example, but the present invention can be applied as well to a picture pickup element device which has other picture pickup elements and is detachably attached to the camera body. Also, an example in which the present invention is applied to a studio camera for broadcasting has been described, but the present invention can be applied to a portable camera for broadcasting and a video camera for business or home use. The range of the picture pickup block 12 is not limited to the range surrounded by the dashed line in FIG. 2. For example, the picture pickup block 12 may include the cleaning circuits 309R, 309G, and 309B for the processing circuits 202R, 202G, and 202B.

INDUSTRIAL APPLICABILITY

As described above, a video camera and a video camera setup method in accordance with the present invention are suitable for application to a video camera in which a picture pickup block, with picture pickup elements, is detachably attached to a camera body, and also suitable for application to a camera for broadcasting, etc., which can be connected to a CCU, VTR, etc., through a camera cable.

TABLE 1

|  | Japan NTSC | U.S. NTSC | Europe PAL |
|---|---|---|---|
| Luminance signal (white level) | 714 mV | 714 mV | 700 mV |
| setup level | 0% | 7.5% | 0% |
| Color difference signal (R-Y, B-Y) peak-to-peak-level | 700 mV | 756 mV | 525 mV |

TABLE 2

| Address | Content | Example of value |
|---|---|---|
| 000-5FF | WHT SHADING | 80 h |
| 700 | Rch Vsub data | 80 h |
| 701 | Gch Vsub data | 80 h |
| 702 | Bch Vsub data | 80 h |
| 703 | VCO off set data | 80 h |
| 704 | BLK off set data | 80 h |
| 705 | Rch Vrg data | 80 h |
| 706 | Gch Vrg data 80 h | |
| 707 | Bch Vrg data 80 h | |
| 708 | 16:9/4:3 | 43 |
| 70C | Destination data (U/J/E) | U |
| 710–711 | ND1 Rch offset | 0 |
| 712–713 | ND1 Bch offset | 0 |
| 714–715 | ND2 Rch offset | 0 |
| 716–717 | ND2 Bch offset | 0 |
| 718–719 | ND3 Rch offset | 0 |
| 71A–71B | ND3 Bch offset | 0 |
| 71C–71D | ND4 Rch offset | 0 |
| 71E–71F | ND4 Bch offset | 0 |
| 720–72F | CCD BLOCK NUM | EA000 |
| 748–749 | MASK (B, R) DATA | 0 |
| 74A–74B | MASK (G,R) DATA | 0 |
| 74C–74D | MASK (R,G) DATA | 0 |
| 74E–74F | MASK (B, G) DATA | 0 |
| 750–751 | MASK (R, B) DATA | 0 |
| 752–753 | MASK (G, B) DATA | 0 |
| 754 | ND1 DATA | FFFFh |
| 756 | ND2 DATA | FFFFh |
| 758 | ND3 DATA | FFFFh |
| 75A | ND4 DATA | FFFFh |
| 75C | CC1 DATA | 2000 h |
| 75E | CC2 DATA | 3802 h |
| 760 | CC3 DATA | 3800 h |
| 762 | CC4 DATA | 3804 h |
| 764–765 | CC1 OFFSET | 0 |
| 766–767 | CC2 OFFSET | 134 |
| 768–769 | CC3 OFFSET | 134 |
| 76A–76B | CC4 OFFSET | 134 |
| 76C | IR CUT FILT DATA | 50 |

What is claimed is:

1. A video camera having picture pickup elements, comprising:

a video camera body having signal processing means which processes picture pickup signals obtained by said picture pickup elements and outputs video signals from which a composite picture signal is generated, said video camera body including a pulse adding circuit for adding an automatic gain control pulse to a vertical blanking interval of said composite picture signal, wherein said automatic gain control pulse is generated according to digital data capable of representing a pulse amplitude and an invalid indication, said automatic gain control pulse is indicative of the attenuation state of said composite picture signal which is generated from the video signals output from said pickup elements, and the amplitude of said automatic gain control pulse is variable;

a picture pickup block which is detachably attached to said video camera body and is formed as an integral unit containing said picture pickup elements and a memory fixedly attached to said picture pickup elements for storing setup data for setting up said video camera; and said video camera body having control means for setting up said video camera based on the setup data stored in said memory;

whereby generating said automatic gain control pulse according to digital data includes using a conversion table that converts a first digital value to a second digital value representing said pulse amplitude and said second digital value is converted to a DC analog signal.

2. A video camera according to claim 1, wherein said setup data stored in said memory means includes shading correction data, and said control means controls said signal processing means so that shading correction is made to video signals output from said video camera body based on shading correction data read from said memory means.

3. A video camera according to claim 1, wherein said setup data stored in said memory means includes aspect ratio data indicating the aspect ratio of said picture pickup elements, and said control means controls said signal processing means so that video signals in accordance with said aspect ratio data read from said memory means are output.

4. A video camera according to claim 3, wherein said video camera body has a view finder displaying said picture pickup signal, and said control means controls said signal processing means so that video signals in accordance with said aspect ratio data are displayed in said view finder.

5. A video camera according to claim 1, wherein said setup data stored in said memory means includes data showing color separation characteristics of a prism for separating into three primary color component lights picture pickup light striking said picture pickup elements, and said control means controls said signal processing means so that a tint of picture pickup signals output from said picture pickup element is corrected in accordance with the data showing color separation characteristics read from said memory means.

6. A video camera according to claim 1, wherein said setup data stored in said memory means includes serial number data for identifying said picture pickup block, and said control means controls said setup data read from said memory means in accordance with said serial number data read from said memory means.

7. A video camera according to claim 1, wherein said setup data stored in said memory means includes clock control data for controlling a drive timing of driving means for driving said picture pickup element, and said control means controls the drive timing of said driving means in accordance with said clock control data read from said memory means.

8. A video camera according to claim 1, wherein said setup data stored in said memory means includes signal-use location data indicating standards for video signals applicable to a relevant country for said picture pickup devices, and said control means controls said signal processing means so as to output video signals in accordance with the signal standard of said relevant country in which said video signals are to be used based on said signal-use location data read from said memory means.

9. A video camera according to claim 8, wherein
said signal processing means has level converting means for converting a signal level into the signal level in accordance with a standard of said signal-use location, an d said control means controls said level converting means so that the signal level of video signals output from said signal processing means is the signal level in accordance with said signal-use location data.

10. A video camera according to claim 9, wherein the video signal level converted by said level converting means includes a luminance signal level and a level of difference between the maximum and minimum levels of color difference signal.

11. A video camera according to claim 1, wherein
said video camera further comprises a camera adapter for connecting external equipment, and said camera adapter includes output means for outputting said video signal output from said video camera body, and storage means for storing connected equipment information data indicating a type of said external equipment.

12. A video camera setup method for setting up a video camera having picture pickup elements,
said video camera comprising a video camera body having signal processing means which processes picture pickup signals obtained by said picture pickup elements and outputs video signals from which a composite picture signal is generated, said video camera body including a pulse adding circuit for adding an automatic gain control pulse to a vertical blanking interval of said composite picture signal, wherein said automatic gain control pulse is generated according to digital data capable of representing a pulse amplitude and an invalid indication, said automatic gain control pulse is indicative of the attenuation state of said composite picture signal which is generated from the video signals output from said pickup elements, and the amplitude of said automatic gain control pulse is variable; and a picture pickup block which is formed as an integral unit containing said picture pickup elements and a memory fixedly attached to said picture pickup elements for storing setup data for setting up said video camera, said picture pickup block being detachably attached to said video camera body, said setup method comprising the steps of:
(a) reading said setup data from said memory in response to the operation of applying power to said picture pickup device; and
(b) performing setup of said picture pickup block and said video camera body based on said setup data read in step (a);

whereby generating said automatic gain control pulse according to digital data includes using a conversion table that converts a first digital value to a second digital value representing said pulse amplitude and said second digital value is converted to a DC analog signal.

13. A video camera setup method according to claim 12, wherein
said setup data stored in said memory means includes shading correction data, and in said step (b), said setup is performed so that shading correction in accordance with the shading correction data read from said memory means is accomplished for video signals output from said video camera body.

14. A video camera setup method according to claim 12, wherein
said setup data stored in said memory means includes aspect ratio data indicating the aspect ratio of said picture pickup elements, and in said step (b), said setup is performed so that video signals in accordance with the aspect ratio data read from said memory means is output.

15. A video camera setup method according to claim 12, wherein
said setup data stored in said memory means includes data showing the color separation characteristics of a prism for separating into three primary color component lights picture pickup light striking said picture pickup element, and in said step (b), said setup is performed so that a tint of picture pickup signals output from said picture pickup element is corrected in accordance with the color separation characteristics read from said memory means.

16. A video camera setup method according to claim 12, wherein
said setup data stored in said memory means includes serial number data for identifying said picture pickup block, and in said step (a), said setup data read from said memory means is controlled in accordance with serial number data read from said memory means.

17. A video camera setup method according to claim 12, wherein
said setup data stored in said memory means includes clock control data for controlling drive timing of driving means for driving said picture pickup element, and in said step (b), the drive timing of said driving means is controlled in accordance with said clock control data read from said memory means.

18. A video camera setup method according to claim 12, wherein
said setup data stored in said memory means includes signal-use location data indicating standards for video signals applicable to a relevant country for said picture pickup device, and in said step (b), said setup is performed so that video signals in accordance with the signal standard of said relevant country in which said video signals are to be used based on said signal-use location data read from said memory means.

19. A video camera setup method according to claim 18, wherein
said signal processing means has level converting means for converting a signal level into the signal level in accordance with the standard of said signal-use location, and in said step (b), said setup is performed so that the signal level of video signals output from said signal processing means is the signal level in accordance with said signal-use location data.

20. A video camera setup method according to claim 19, wherein the video signal level converted by said level converting means includes a luminance signal level and a level of difference between maximum and minimum levels of color difference signal.

21. A video camera according to claim 2, wherein when said picture pickup block is attached to said camera body, a determination of the serial number of said picture pickup block is made, and shading correction data is read from said memory means only if the determined serial number is different from the serial number of a picture block that was previously attached to said camera body.

22. A video camera setup method according to claim 13, wherein when said picture pickup block is attached to said camera body, a determination of the serial number of said picture pickup block is made, and shading correction data is read from said memory means only if the determined serial number is different from the serial number of a picture block that was previously attached to said camera body.

* * * * *